(12) United States Patent
Cheng et al.

(10) Patent No.: US 11,985,662 B2
(45) Date of Patent: May 14, 2024

(54) METHOD AND APPARATUS FOR TRANSMISSION TIMING ENHANCEMENT FOR DIFFERENT NUMEROLOGIES IN NTN

(71) Applicant: FG Innovation Company Limited, Tuen Mun (HK)

(72) Inventors: Chien-Chun Cheng, Taipei (TW); Chia-Hao Yu, Taipei (TW); Hung-Chen Chen, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 108 days.

(21) Appl. No.: 17/038,481

(22) Filed: Sep. 30, 2020

(65) Prior Publication Data

US 2021/0105761 A1    Apr. 8, 2021

Related U.S. Application Data

(60) Provisional application No. 62/910,578, filed on Oct. 4, 2019, provisional application No. 62/910,587, filed on Oct. 4, 2019.

(51) Int. Cl.
*H04W 72/20*   (2023.01)
*H04L 1/1812*   (2023.01)
(Continued)

(52) U.S. Cl.
CPC ........... *H04W 72/20* (2023.01); *H04L 1/1812* (2013.01); *H04L 5/0048* (2013.01);
(Continued)

(58) Field of Classification Search
None
See application file for complete search history.

(56) References Cited

U.S. PATENT DOCUMENTS

2017/0273056 A1    9/2017  Papasakellariou
2019/0261405 A1*   8/2019  Ang .................. H04W 72/1263
(Continued)

FOREIGN PATENT DOCUMENTS

CA    3088813 A1 *  7/2019  ......... G03G 15/0126
EP    3547779 A1    10/2019
(Continued)

OTHER PUBLICATIONS

Sony, Discussion on uplink timing advance and RACH procedure, 3GPP TSG RAN WG1 #96bis, R1-1904244, Apr. 12, 2019, p. 3.
(Continued)

*Primary Examiner* — Kenny S Lin
*Assistant Examiner* — Rodrick Mak
(74) *Attorney, Agent, or Firm* — ScienBiziP, P.C.

(57) ABSTRACT

A user equipment (UE) includes one or more non-transitory computer-readable media containing computer-executable instructions embodied therein, and at least one processor coupled to the one or more non-transitory computer-readable media. The at least one processor configured to execute the computer-executable instructions to receive downlink control information (DCI) on a downlink (DL) channel of a non-terrestrial network (NTN), the DL channel reception ending in a first slot, and transmit an uplink (UL) transmission on a UL channel of the NTN in a second slot. The second slot is separate from the first slot by a timing offset, where a duration of the timing offset is dependent on a type of the UL transmission and a numerology of the UL transmission.

14 Claims, 6 Drawing Sheets

(51) Int. Cl.
  *H04L 5/00*       (2006.01)
  *H04W 72/0446*    (2023.01)
  *H04W 72/0453*    (2023.01)
  *H04W 74/08*      (2009.01)
  *H04W 74/0833*    (2024.01)

(52) U.S. Cl.
  CPC .... *H04W 74/0833* (2013.01); *H04W 72/0446* (2013.01); *H04W 72/0453* (2013.01)

(56) References Cited

U.S. PATENT DOCUMENTS

| | | | | |
|---|---|---|---|---|
| 2020/0229180 | A1* | 7/2020 | Liu | H04L 5/0051 |
| 2021/0105731 | A1* | 4/2021 | Lin | H04L 5/0087 |
| 2021/0321353 | A1* | 10/2021 | Muruganathan | H04W 72/0446 |
| 2022/0078823 | A1* | 3/2022 | Li | H04L 5/0051 |
| 2022/0287048 | A1* | 9/2022 | Lin | H04L 27/2655 |
| 2023/0164818 | A1* | 5/2023 | Nimbalker | H04L 5/0053 370/329 |

FOREIGN PATENT DOCUMENTS

| | | |
|---|---|---|
| WO | 2018031770 A | 2/2018 |
| WO | 2019161044 A1 | 8/2019 |
| WO | WO-2022152098 A1 * | 7/2022 |

OTHER PUBLICATIONS

Asia Pacific Telecom, Discussion on physical layer control procedures for NTN, 3GPP TSG-RAN WG1 Meeting #98-Bis, R1-1910845, Oct. 20, 2019, pp. 1-2.

Ericsson, FL summary#0 for physical layer control procedures for NTN, 3GPP TSG-RAN WG1 Meeting #98, R1-1909485, Aug. 30, 2019, p. 4.

Mediatek Inc., Physical layer control procedure in NR-NTN, 3GPP TSG RAN WG1 Meeting #98, R1-1908014, Aug. 30, 2019, the whole document.

3GPP TR 38.811, "3rd Generation Partnership Project; Technical Specification Group Radio Access Network; Study on New Radio (NR) to support non-terrestrial networks (Release 15)", V15.1.0 (Jun. 2019).

3GPP TR 38.821, "3rd Generation Partnership Project; Technical Specification Group Radio Access Network; Solutions for NR to support non-terrestrial networks (NTN) (Release 16)", V0.7.0 (May 2019).

3GPP TS 38.214, "3rd Generation Partnership Project; Technical Specification Group Radio Access Network; NR; Physical layer procedures for data (Release 15)", V15.7.0 (Sep. 2019).

3GPP TS 38.321, "3rd Generation Partnership Project; Technical Specification Group Radio Access Network; NR; Medium Access Control (MAC) protocol specification (Release 15)", V15.7.0 (Sep. 2019).

3GPP TS 38.133, "3rd Generation Partnership Project; Technical Specification Group Radio Access Network; NR; Requirements for support of radio resource management (Release 15)", V15.7.0 (Sep. 2019).

MCC Support: "Draft Report of 3GPP TSG RAN WG1 #98 v0.2.0 (Prague, Czech Rep, Aug. 26-30, 2019)", 3GPP Draft; DRAFT_MINUTES_REPORT_RAN1#98_V020, Sep. 11, 2019 (Sep. 11, 2019).

LG Electronics: "Discussion on UL power control for NR non-CA case", 3GPP Draft; R1-1719944 NR UL PC_NONCA_FINAL, Nov. 18, 2017 (Nov. 18, 2017).

* cited by examiner

METHOD AND APPARATUS FOR TRANSMISSION TIMING ENHANCEMENT FOR DIFFERENT NUMEROLOGIES IN NTN

CROSS-REFERENCE TO RELATED APPLICATION(S)

The present disclosure claims the benefits of and priorities of provisional U.S. patent application Ser. No. 62/910,578, filed on Oct. 4, 2019, entitled "Transmission Timing Enhancement for Different Numerologies in NTN" ("the '578 provisional") and provisional U.S. Patent Application Ser. No. 62/910,587, filed on Oct. 4, 2019, entitled "Common Timing Advance for UL Timing and PRACH in NTN" ("the '587 provisional"). The disclosures of the '578 and '587 provisionals are hereby incorporated fully by reference into the present disclosure for all purposes.

FIELD

The present disclosure is related to wireless communication, and more particularly, to methods and apparatuses for transmission timing enhancement for different numerologies in Non-Terrestrial Networks (NTNs).

BACKGROUND

NTNs refer to networks, or segments of networks, using a spaceborne vehicle for transmission, e.g., using Low Earth Orbiting (LEO) satellites and Geostationary Earth Orbiting (GEO) satellites. The possible reference scenarios and architecture options for NTNs will be identified and described in the 3rd Generation Partnership Project (3GPP) specifications. In the 3GPP Release-16, some scenarios have been started with key issues and potential solutions. For example, Transparent GEO satellite network refers to a relay-based NTN, including radiofrequency (RF) functions only. The GEO satellites simply perform amplify-and-forward in space. Transparent LEO satellite network refers to a relay-based NTN. In this case, the LEO satellites simply perform amplify-and-forward in space. Regenerative LEO satellite network refers to a network architecture, where LEO satellites have full capability of RAN functions as a base station in NR. In this case, UEs are served directly by the satellites.

Normative work may focus on the satellite-based network to provide broadband service in unserved areas for mobile devices and vehicle-mounted devices.

There is a need in the art to identify potential impacts and required enhancements on a baseline design of the terrestrial network (TN) based on the 3GPP Release-15 New Radio (NR).

SUMMARY

The present disclosure is related to methods and apparatuses for transmission timing enhancement for different numerologies in NTNs.

According to a first aspect of the present disclosure, a user equipment (UE) is provided. The UE includes one or more non-transitory computer-readable media containing computer-executable instructions embodied therein, and at least one processor coupled to the one or more non-transitory computer-readable media. The at least one processor is configured to execute the computer-executable instructions to receive DCI on a DL channel of an NTN, the DL channel reception ending in a first slot, and transmit a UL transmission on a UL channel of the NTN in a second slot, where the second slot is separate from the first slot by a timing offset, and a duration of the timing offset is dependent on a type of the UL transmission and a numerology of the UL transmission.

In an implementation of the first aspect, the DL channel is a PDCCH, the UL channel is a PUCCH, the UL transmission includes a HARQ-ACK. The HARQ-ACK on the PUCCH is transmitted on slot $\lfloor n\cdot 2^{\mu_{PUCCH}-\mu_{PDCCH}}\rfloor+K_1+K_{offset}$, the PDCCH reception ending in slot n, $\mu_{PUSCH}$ being a subcarrier spacing of the PUCCH, $\mu_{PDCCH}$ being a subcarrier spacing of the PDCCH, $K_1$ being an offset value indicated in the DCI, and $K_{offset}$ being an additional offset value for compensating a required timing advance (TA) and a processing delay for operation in the NTN.

In another implementation of the first aspect, the DL channel is a PDCCH, and the UL channel is a PUSCH. The UL transmission on the PUSCH is scheduled by the DCI, and is transmitted on slot $\lfloor n\cdot 2^{\mu_{PUCCH}-\mu_{PDCCH}}\rfloor+K_1+K_{offset}$, the PDCCH reception ending in slot n, $\mu_{PUSCH}$ being a subcarrier spacing of the PUSCH, $\mu_{PDCCH}$ being a subcarrier spacing of the PDCCH, $K_2$ being an offset value based on a numerology of the PUSCH, and $K_{offset}$ being an additional offset value for compensating a required timing advance (TA) and a processing delay for operation in the NTN.

In yet another implementation of the first aspect, the DL channel is a PDCCH, the UL channel is a PUSCH, the UL transmission includes CSI. The CSI on the PUSCH is transmitted on slot $\lfloor n\cdot 2^{\mu_{PUCCH}-\mu_{PDCCH}}\rfloor+K_1+K_{offset}$, the PDCCH reception ending in slot n, $\mu_{PUSCH}$ being a subcarrier spacing of the PUSCH, $\mu_{PDCCH}$ being a subcarrier spacing of the PDCCH, K being an offset value indicated in the DCI, and $K_{offset}$ being an additional offset value for compensating a required timing advance (TA) and a processing delay for operation in the NTN.

In yet another implementation of the first aspect, the UL transmission includes CSI. A CSI reference resource is provided in the DL transmission in slot $n-n_{CSI\_ref}$, where $$n = \left\lfloor (n' - K_{offset}) \cdot \frac{2^{\mu_{DL}}}{2^{\mu_{UL}}} \right\rfloor,$$

$n_{CSI\_ref}$ being an offset value determined by the UE, the CSI transmission being in slot n', $\mu_{DL}$ being a subcarrier spacing of the DL channel, $\mu_{UL}$ being a subcarrier spacing of the UL channel, and $K_{offset}$ being an additional offset value for compensating a required timing advance (TA) and a processing delay for operation in the NTN.

In yet another implementation of the first aspect, the DCI is received in slot n, the DCI triggering aperiodic Sounding Reference Signal (SRS) transmissions. The UL transmission includes the aperiodic SRS transmissions in each of the triggered aperiodic SRS resource sets in slot $$\left\lfloor n \cdot 2^{\frac{\mu_{SRS}}{\mu_{PDCCH}}} \right\rfloor + k + K_{offset},$$

the DCI triggering the aperiodic SRS transmissions ending in slot n, $\mu_{SRS}$ being a subcarrier spacing of the triggered SRS transmission, $\mu_{PDCCH}$ being a subcarrier spacing of the PDCCH, K being an offset value indicated in the DCI, and $K_{offset}$ being an additional offset value for compensating a required timing advance (TA) and a processing delay for operation in the NTN.

In yet another implementation of the first aspect, the DL channel is a PDSCH having a Random Access Response (RAR) message ending in slot n, the RAR message being response to a Physical Random Access Channel (PRACH) preamble transmitted by the UE. The UL channel is a PUSCH. The UL transmission includes at one transport block (TB). The TB on the PUSCH is transmitted in slot n'+$K_2$+$\Delta$+$K_{offset}$, where n'=$\lfloor n \cdot 2^{\mu_{PUSCH}-\mu_{PDSCH}} \rfloor$, $\mu_{PUSCH}$ being a subcarrier spacing of the PUSCH, $\mu_{PDCCH}$ being a sub carrier spacing of the PDCCH, $K_2$ being an offset value based on a numerology of the PUSCH, $\Delta$ being an additional subcarrier spacing specific slot delay value for a first transmission of the PUSCH scheduled by the RAR message, and $K_{offset}$ being an additional offset value for compensating a required timing advance (TA) and a processing delay for operation in the NTN.

the present disclosure, a method for wireless communication performed by a UE is provided. The method includes receiving DCI on a DL channel of an NTN, the DL channel reception ending in a first slot, and transmitting a UL transmission on a UL channel of the NTN in a second slot, where the second slot is separate from the first slot by a timing offset, and a duration of the timing offset is dependent on a type of the UL transmission and a numerology of the UL transmission.

In an implementation of the second aspect, the DL channel is a PDCCH, the UL channel is a PUCCH, the UL transmission includes a HARQ-ACK. The HARQ-ACK on the PUCCH is transmitted on slot $\lfloor n \cdot 2^{\mu_{PUCCH}-\mu_{PDCCH}} \rfloor$+$K_1$+$K_{offset}$, the PDCCH reception ending in slot n, $\mu_{PUCCH}$ being a subcarrier spacing of the PUCCH, $\mu_{PDCCH}$ being a subcarrier spacing of the PDCCH, $K_1$ being an offset value indicated in the DCI, and $K_{offset}$ being an additional offset value for compensating a required timing advance (TA) and a processing delay for operation in the NTN.

In another implementation of the second aspect, the DL channel is a PDCCH, and the UL channel is a PUSCH. The UL transmission on the PUSCH is scheduled by the DCI, and is transmitted on slot $\lfloor n \cdot 2^{\mu_{PUCCH}-\mu_{PDCCH}} \rfloor$+$K_1$+$K_{offset}$, the PDCCH reception ending in slot n, $\mu_{PUSCH}$ being a subcarrier spacing of the PUSCH, $\mu_{PDCCH}$ being a subcarrier spacing of the PDCCH, $K_2$ being an offset value based on a numerology of the PUSCH, and $K_{offset}$ being an additional offset value for compensating a required timing advance (TA) and a processing delay for operation in the NTN.

In yet another implementation of the second aspect, the DL channel is a PDCCH, the UL channel is a PUSCH, the UL transmission includes CSI. The CSI on the PUSCH is transmitted on slot $\lfloor n \cdot 2^{\mu_{PUCCH}-\mu_{PDCCH}} \rfloor$+$K_1$+$K_{offset}$, the PDCCH reception ending in slot n, $\mu_{PUSCH}$ being a subcarrier spacing of the PUSCH, $\mu_{PDCCH}$ being a subcarrier spacing of the PDCCH, K being an offset value indicated in the DCI, and $K_{offset}$ being an additional offset value for compensating a required timing advance (TA) and a processing delay for operation in the NTN.

In yet another implementation of the second aspect, the UL transmission includes CSI. A CSI reference resource is provided in the DL transmission in slot n=$n_{CSI\_ref}$, where $$n = \left\lfloor (n' - K_{offset}) \cdot \frac{2^{\mu_{DL}}}{2^{\mu_{UL}}} \right\rfloor,$$

$n_{CSI\_ref}$ being an offset value determined by the UE, the CSI transmission being in slot n', $\mu_{DL}$ being a subcarrier spacing of the DL channel, $\mu_{UL}$ being a subcarrier spacing of the UL channel, and $K_{offset}$ being an additional offset value for compensating a required timing advance (TA) and a processing delay for operation in the NTN.

In yet another implementation of the second aspect, the DCI is received in slot n, the DCI triggering aperiodic Sounding Reference Signal (SRS) transmissions. The UL transmission includes the aperiodic SRS transmissions in each of the triggered aperiodic SRS resource sets in slot $$\left\lfloor n \cdot 2^{\frac{\mu_{SRS}}{\mu_{PDCCH}}} \right\rfloor + k + K_{offset},$$

the DCI triggering the aperiodic SRS transmissions ending in slot n, $\mu_{SRS}$ being a subcarrier spacing of the triggered SRS transmission, $\mu_{PDCCH}$ being a subcarrier spacing of the PDCCH, K being an offset value indicated in the DCI, and $K_{offset}$ being an additional offset value for compensating a required timing advance (TA) and a processing delay for operation in the NTN.

In yet another implementation of the second aspect, the DL channel is a PDSCH having a Random Access Response (RAR) message ending in slot n, the RAR message being response to a Physical Random Access Channel (PRACH) preamble transmitted by the UE. The UL channel is a PUSCH. The UL transmission includes at one transport block (TB). The TB on the PUSCH is transmitted in slot n'+$K_2$+$\Delta$+$K_{offset}$, where n'=$\lfloor n \cdot 2^{\mu_{PUCCH}-\mu_{PDCCH}} \rfloor$, $\mu_{PUSCH}$ being a subcarrier spacing of the PUSCH, $\mu_{PDCCH}$ being a sub carrier spacing of the PDCCH, $K_2$ being an offset value based on a numerology of the PUSCH, $\Delta$ being an additional subcarrier spacing specific slot delay value for a first transmission of the PUSCH scheduled by the RAR message, and $K_{offset}$ being an additional offset value for compensating a required timing advance (TA) and a processing delay for operation in the NTN.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DESCRIPTION

Figure 1:
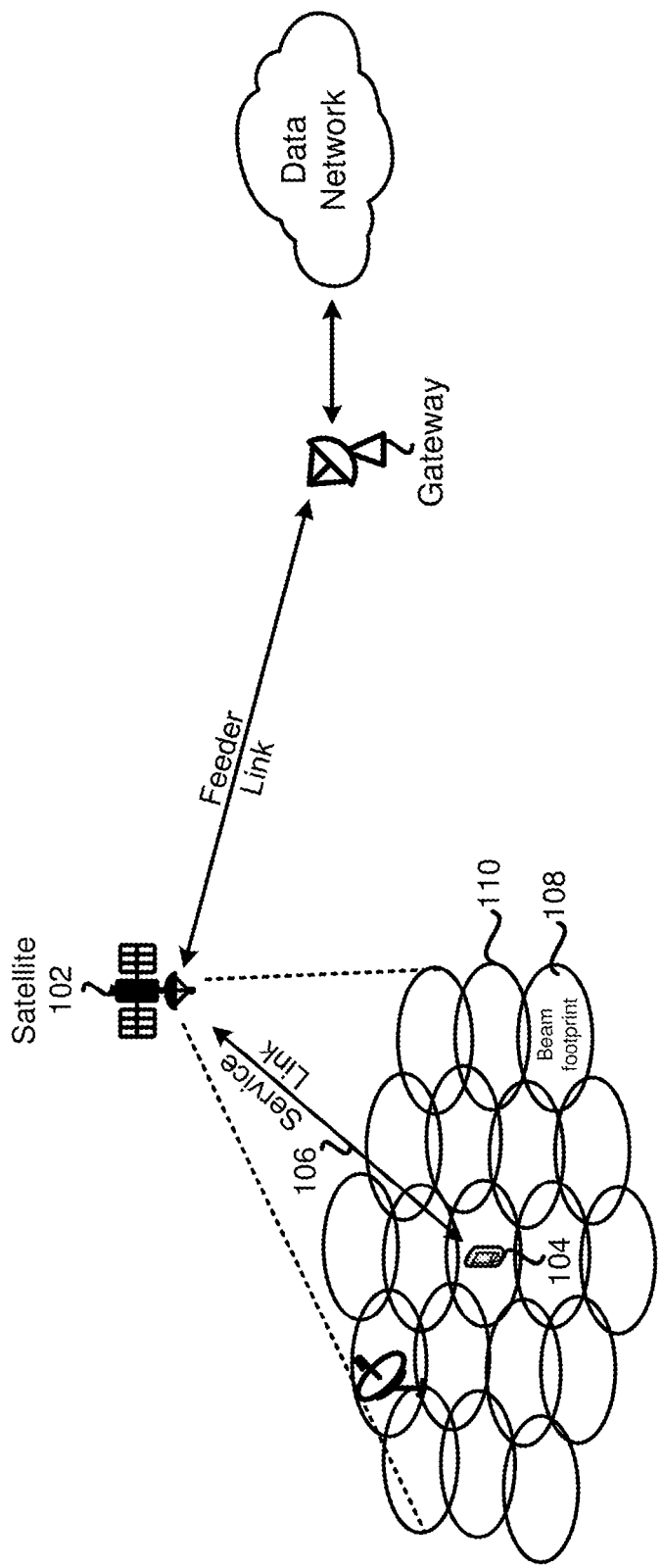
FIG. 1 illustrates a diagram illustrating wireless communication in an NTN based on transparent payload.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more B Ss.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally uplink (UL) resources to at least one UE within its radio coverage for DL and optionally UL packet transmissions. The BS can communicate with one or more UEs in the radio communication system via the plurality of cells.

A cell may allocate SL resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

In various implementations of the present disclosure, in order to benefit from delta signaling when modifying lists with many and/or large elements, so-called add/mod- and release-lists may be used. Instead of a single list containing all elements of the list, the ASN.1 provides two lists. One list is used to convey the actual elements that are to be added to the list or modified in the list. The second list conveys only the identities (IDs) of the list elements that are to be released from the list. In other words, the ASN.1 defines only means to signal modifications to a list maintained in the receiver (typically the UE).

Example description of some selected terms used in this disclosure are given below.

Primary Cell (PCell): For dual connectivity (DC) operation, PCell is the master cell group (MCG) cell, operating on the primary frequency, in which the UE either performs the initial connection establishment procedure or initiates the connection re-establishment procedure.

Primary SCG Cell (PSCell): For DC operation, PSCell is the secondary cell group (SCG) cell in which the UE performs random access when performing the Reconfiguration with Sync procedure.

Special Cell: For DC operation the term Special Cell (SpCell) refers to the PCell of the MCG or the PSCell of the SCG, otherwise the term Special Cell refers to the PCell.

Secondary Cell: For a UE configured with carrier aggregation (CA), a cell providing additional radio resources on top of Special Cell.

Serving Cell: For a UE in RRC_CONNECTED not configured with CA/DC, there is only one serving cell, which may be referred to as the primary cell. For a UE in RRC_CONNECTED configured with CA/DC, the term "serving cells" may be used to denote the set of cells including the SpCell(s) and all secondary cells.

HARQ: A functionality ensures delivery between peer entities at Layer 1 (i.e., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each of HARQ entity supports a parallel (number) of DL and UL HARQ process.

Hybrid automatic repeat request acknowledgement (HARQ-ACK): A HARQ-ACK information bit value of 0 represents a negative acknowledgement (NACK) while a HARQ-ACK information bit value of 1 represents a positive acknowledgement (ACK).

Timer: MAC entity can setup one or more timers for individual purposes, for example, triggering some uplink signaling retransmission or limiting some uplink signaling retransmission period. A timer is running once it is started, until it is stopped or until it expires; otherwise it is not running. A timer can be started if it is not running or restarted if it is running. A Timer is always started or restarted from its initial value. Wherein the initial value can be but not limited to be configured by the gNB via downlink RRC signaling.

BWP: A subset of the total cell bandwidth of a cell is referred to as a Bandwidth Part (BWP) and BA is achieved by configuring the UE with BWP(s) and telling the UE which of the configured BWPs is currently the active one. To enable Bandwidth Adaptation (BA) on the PCell, the gNB configures the UE with UL and DL BWP(s). To enable BA on SCells in case of CA, the gNB configures the UE with DL BWP(s) at least (i.e. there may be none in the UL). For the PCell, the initial BWP is the BWP used for initial access. For the SCell(s), the initial BWP is the BWP configured for the UE to first operate at SCell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-) configuration does not impose a BWP switch. If the first active uplink BWP is configured for an SCell, the firstActiveUplinkBWP IE field contains the ID of the uplink bandwidth part to be used upon MAC-activation of an SCell.

PDCCH: In the downlink, the gNB can dynamically allocate resources to UEs via the C-RNTI/MCS-C-RNTI/CS-RNTI on PDCCH(s). A UE always monitors the PDCCH(s) in order to find possible assignments when its downlink reception is enabled (activity governed by DRX when configured). When CA is configured, the same C-RNTI applies to all serving cells.

PDSCH/PUSCH: The PDCCH can be used to schedule DL transmissions on PDSCH and UL transmissions on PUSCH.

Transport Block: The data from the upper layer (or MAC) given to the physical layer is basically referred as transport block.

Referring to FIG. 1, FIG. 1 illustrates a diagram illustrating wireless communication in an NTN based on transparent payload. As illustrated in FIG. 1, a non-terrestrial network providing access to user equipment is depicted below. A field of view of a satellite 102 (or a UAS platform) is shown. A beam 106 (service link) may be generated by an antenna on-board the satellite 102. Satellite 102 (or aerial vehicles) typically generate several beams over a given area. The footprint 108 of the beams 110 are typically elliptic shape. The beam footprint 108 may be moving over the earth with the satellite 102 (or the aerial vehicle) motion on its orbit. Alternatively, the beam footprint 108 may be earth fixed, in such case some beam pointing mechanisms (mechanical or electronic steering feature) may compensate for the satellite or the aerial vehicle motion.

In NR, for example in FDD mode, uplink (UL) and downlink (DL) slots can be configured independently. There is one set of UL slots and another set of DL slots. Different numerologies for the UL and the DL are thus supported.

Timing Advance (TA) is used to adjust the uplink frame timing relative to the downlink frame timing. The DL and UL timing are aligned at gNB with timing advance. The timing advance is twice the value of the propagation delay. Different UEs usually have different timing advance.

TA ensures time alignment at the receiver side, in order to avoid uplink transmissions received from different devices within a cell causing excessive interference to each other. A requirement for this uplink orthogonality to hold is that the uplink slot/symbol boundaries for given numerology are time-aligned within a certain threshold at the base station. Ideally, any timing misalignment between received signals should fall within the cyclic prefix.

In NR, the timing relationship between the DL reception and the UL transmission is defined with a consideration of TA and UE processing time, e.g., a set of scheduling offset parameters specified in NR is listed below:

$K_1$ is used to specify the time gap between PDSCH and PUCCH;

$K_2$ is used to specify the time gap between PDCCH and PUSCH.

Due to short TA usage in terrestrial networks, no special consideration is raised in NR.

However, due to the long TA requirement in NTNs, the timing relationship between the DL and the UL need to be enhanced.

For example, for a DL scheduling of a PDSCH, the configuration of $K_1$ is relevant with UE processing delay and TA. In principle, a scheduled PUCCH transmission should not be started before its scheduling PDSCH reception. Otherwise, a scheduling disorder happens such that UE cannot generate acknowledgement of the PDSCH for the PUCCH transmission. To handle this issue, a new timing offset has been introduced to cover the long TA plus processing delay.

More specifically, the 3GPP has made the following agreement.

a wrong UL timing based on a wrong numerology assumption on $K_{offset}$.

For example, in the first bullet item of the agreement, it is sensible to assume that $K_{offset}$ is based on the UL numerology. But in the fourth bullet item, applying UL numerology on the same term $K_{offset}$ would not result in sensible interpretation. To avoid ambiguity, there is a need to clarify the numerology of $K_{offset}$.

Also, there are additional NR procedures need to be specified in the 3GPP specifications. For examples, aperiodic sounding reference signal (AP SRS), CSI report after secondary cell (SCell) activation, message 3 (Msg3) PUSCH transmission, PDSCH with slot aggregation, semi-persistent (SPS) PDSCH, and cross-carrier scheduling, etc.

In addition, $K_{offset}$ may not be configured explicitly on a beam basis, because current consensus assumes that satellite beams are not visible from UE perspective. Consequently, it is unclear how to associate $K_{offset}$ and a satellite beam in an implicit manner.

Moreover, $K_{offset}$ may need frequent updates to cover TA. This is because TA is a time-varying parameter for the LEO deployment, which changes so fast such that TA may need to update every 14.7 ms with SCS=120 kHz, to prevent timing drifting and inter UE interference that may degrade system performance. To avoid frequent update of $K_{offset}$, signaling overhead reduction needs to be further considered.

To handle the above-mentioned issues, implementations of the present disclosure provide the following solutions.

In various implementations of the present disclosure, one or more solutions are provided to define numerology and slot format of $K_{offset}$.

In accordance with an implementation to define numerology and slot format of $K_{offset}$, the slot offset $K_{offset}$ is based

---

Agreement in RAN1#98

---

For UL transmission timing, introduce an offset $K_{offset}$ for NR NTN.

For UL HARQ-ACK on PUCCH, where HARQ ACK on PUCCH is transmitted on slot n + $K_1$ + $K_{offset}$ when a scheduling DCI is received in slot n.

For UL transmission on PUSCH, where PUSCH is transmitted on slot $\lfloor n \cdot 2^{\mu_{PUSCH}-\mu_{PDCCH}} \rfloor$ + $K_2$ + $K_{offset}$ when a scheduling DCI is received in slot n.

For CSI transmission on PUSCH, where CSI on PUSCH is transmitted on slot n + K + $K_{offset}$, when the DCI with CSI request is received in slot n and K is selected by the DCI.

For a CSI report in uplink slot n', the CSI reference resource is given in downlink slot $$n - n_{CSI\_ref} - K_{offset}, \text{ where } n = \left\lfloor n' \cdot \frac{2^{\mu_{DL}}}{2^{\mu_{UL}}} \right\rfloor \text{ and } n_{CSI\_ref} \text{ is as defined in 38.214.}$$

$K_{offset}$ is per beam or per-cell

FFS: Whether $K_{offset}$ is derived from broadcast information or is signaled by higher layers

---

For a proper schedule timing of UL transmission, a new timing offset $K_{offset}$ is introduced to assist the values of $K_1$ and $K_2$ to cover the required TA and the processing delay.

However, in the current 3GPP specifications, it is not clear whether the offset value of $K_{offset}$ is counted by UL slots or DL slots. If there is no clear definition, when the UL and the DL links apply different numerologies, a UE may interpret on the numerology of the scheduled UL resource(s) (e.g., PUSCH or PUCCH), such that the previous agreement may be updated as follows.

Changes to the Current Agreement in bold
For UL transmission timing, introduce an offset $K_{offset}$ for NR NTN.
 For UL HARQ-ACK on PUCCH, where HARQ ACK on PUCCH is

-continued transmitted on slot $\lfloor n \cdot 2^{\mu_{PUCCH}-\mu_{PDCCH}} \rfloor + K_1 + K_{offset}$ when a scheduling DCI is received in slot n.
For UL transmission on PUSCH, where PUSCH is transmitted on slot $\lfloor n \cdot 2^{\mu_{PUSCH}-\mu_{PDCCH}} \rfloor + K_2 + K_{offset}$ when a scheduling DCI in received in slot n.
For CSI transmission on PUSCH, where CSI on PUSCH is transmitted on slot $\lfloor n \cdot 2^{\mu_{PUSCH}-\mu_{PDCCH}} \rfloor + K + K_{offset}$, when the DCI with CSI request is received in slot n and K is selected by the DCI.
For a CSI report in uplink slot n', the CSI reference resource is given in downlink slot $n - n_{CSI\_ref}$, where $n = \left\lfloor (n' - K_{offset}) \cdot \frac{2^{\mu_{DL}}}{2^{\mu_{UL}}} \right\rfloor$ and $n_{CSI\_ref}$ is as defined in 38.214.
$K_{offset}$ is per beam or per-cell
FFS: Whether $K_{offset}$ is derived from broadcast information or is signaled by higher layers In the present implementation, a UE may receive a scheduling DCI in a DL slot n, and the corresponding UL slot n' is derived by using a mapping function of n'=$\lfloor n \cdot 2^{\mu_{UL}-\mu_{DL}} \rfloor$, where $\lfloor \cdot \rfloor$ denotes the floor operation, $\mu_{UL}$ denotes subcarrier spacing (SCS) on a UL channel, e.g., PUCCH or PUSCH, and $\mu_{DL}$ refers to SCS on a DL channel, e.g., PDCCH or PDSCH.

After the proper slot mapping, the slot offsets K, $K_1$, $K_2$, and $K_{offset}$ are all based on the UL numerology such that adding or subtracting can be done with the same SCS definition.

In various implementations of the present disclosure, additional NR procedures with transmission offset consideration are provided.

Solution 1: AP-SRS

The time gap between a scheduling DCI in a PDCCH and its scheduled AP-SRS may be extended to k+$K_{offset}$, where k and $K_{offset}$ are configured by higher layer messages or via layer 1 (L1) signaling, e.g., RRC information element (IE), MAC control element (CE), or DCI field indicators.

Solution 2: Secondary Cell Activation in Carrier Aggregation

The time gap between an activation command for an SCell in a PDSCH and the actions related to CSI reporting in a PUCCH may be extended to $K_1+3 \cdot N_{slot}^{subframe,\mu}+1+K_{offset}$, where $N_{slot}^{subframe,\mu}$ is a number of slots per subframe for the SCS configuration $\mu$ of the PUCCH transmission. $K_1$ and $K_{offset}$ are higher layer configured or indicated by L1 signaling.

Solution 3: Msg3 PUSCH Transmission and Retransmission

The time gap between a PDSCH with a random-access response (RAR) message and the corresponding PUSCH may be extended to $k_2+\Delta+K_{offset}$, where $k_2$ and $\Delta$ are provided by higher layer messages or indicated by L1 signaling.

Solution 4: PDSCH with Slot Aggregation

The time gap between a PDSCH reception of continuous $N_{PDSCH}^{repeat}$ slots and a PUCCH or PUSCH transmission for the related HARQ-ACK codebook may be extended to k+$K_{offset}$, where k is a number of slots indicated by a DCI field in a corresponding DCI format or provided by a higher layer parameter.

Solution 5: SPS PDSCH

The time gap between an SPS PDSCH reception ending slot and the corresponding PUCCH transmission slot may be extended to k+$K_{offset}$, where k is provided by a DCI or provided by a higher layer parameter.

Solution 6: Cross-Carrier Scheduling

In Rel-15 NR, cross-carrier scheduling with the same numerology is supported. The time gap between a scheduling DCI in a PDCCH of a carrier and its scheduling UL transmission of another carrier may be extended to k+$K_{offset}$, where k and $K_{offset}$ are configured by higher layers or indicated by L1 signaling.

In Rel-16 NR, cross-carrier scheduling with different numerologies is supported. The time gap between a scheduling DCI in a PDCCH of a carrier and its scheduling UL transmission of another carrier may be extended to k+δ+$K_{offset}$, where k and $K_{offset}$ are configured by higher layers or indicated by L1 signaling, and δ is specified in the NR specs.

Solution 7: RRC_Connection Establishment and UE Capability Negotiation

In Rel-15 NR, UE may indicate its preferred slice (i.e., NASSI) to the NW. If the UE indicates a "URLLC" slice is preferred, NW will try to configure $K_{offset}$ per beam or per cell in order to shorten the transmission latency (for fulfilling URLLC requirement); otherwise no additional $K_{offset}$ configuration would be applied and UE may use a default value or broadcasted value from the cell.

The UE may indicate whether it can support $K_{offset}$ adaption during the negotiation procedure. For instance, 2 bits are used where "00" refer no support, "01" refer adaption be supported per beam and "10" refer adaption be supported per cell.

In various implementations of the present disclosure, one or more solutions are provided to configure $K_{offset}$ per beam.

Solution 1: Associate $K_{offset}$ to a DL BWP

The slot offset $K_{offset}$ may be configured per Bandwidth part (BWP) per serving cell.

For a case of a single beam per cell, each beam may be associated with a cell. This leads to an association between $K_{offset}$ and a beam.

For a case of multiple beams per cell, if each beam is associated with a DL BWP, this leads to an association between $K_{offset}$ and a beam.

Solution 2: Associate $K_{offset}$ to a DL SSB

The slot offset $K_{offset}$ may be associated with a DL Synchronization Signal Block (SSB).

For both single beam per cell or multiple beams for cell. If each beam is associated with a DL SSB in a cell, this leads to an association between $K_{offset}$ and a beam.

Solution 3: group-based $K_{offset}$

The slot offset $K_{offset}$ may be indicated directed to a group of devices using an RNTI specific for that group and each device is configured with the scheduling offset bits of $K_{offset}$ in the join message it should follow. The $K_{offset}$ command may be indicated using a new DCI format.

The grouping rule for UEs can be one of the following:
Location of a UE, e.g., in which satellite beam, or in which country, or in which latitude, e.g., high latitude like Alaska or low latitude like California, or in which terrestrial environment, e.g., mountain, sea, urban, or rural.
Altitude of a UE, e.g., in an airplane for 20 km or in a helicopter for 3 km.
Service/device types of a UE, e.g., EMBB, URLLC, VSAT, or vehicle mounted.
Different waveforms or different polarizations, e.g., CP-OFDM, DFT-s-OFDM, linear polarization, or circular polarization.

In various implementations of the present disclosure, various solutions are provided to reduce signaling overhead.

Solution 1: Associate with TA

The only intention to introduce $K_{offset}$ is to cover TA. Since a base station already maintains TA for UEs, $K_{offset}$ may be associated with TA to save signaling overhead.

For example, $K_{offset}$ is calculated by UE based on TA plus a configured or a specified timing offset.

Solution 2: Associate with Common TA

A common TA value may be broadcasted per cell. $K_{offset}$ may be associated with the common TA to save signaling overhead. For example, $K_{offset}$ is calculated by UE based on the common TA plus a configured or a specified timing offset.

Solution 3: Determine $K_{offset}$ Based on the Worst-Case TA $K_{offset}$ may be associated with the worst-case TA, i.e., the largest TA value in a serving cell or for a given satellite beam, to save signaling overhead.

The largest TA value can be calculated according to the round-trip time (RTT) between the farthest point to network (NW) or a base station from the Earth surface for a given beam.

In this case, $K_{offset}$ can be derived by UE (calculated based on UE location, e.g., GNSS, and satellite ephemeris), or indicated by NW by UE-specific signaling (for a UE) or group-UE signaling (for a group of UEs) or cell broadcasting (for all UE in the same serving cell).

In this case with an alternative, $K_{offset}$ may be pre-defined in the specs. For example, three values are pre-defined in the specs, with each of them corresponding to a GEO, MEO, or LEO satellite. After UE detection of the scenario, one of the values can be applied by UE.

Referring back to the solutions of defining numerology and slot format of $K_{offset}$, the numerology of $K_{offset}$ may be based on slots for PUCCH or PUSCH transmissions. The following are one or more HARQ related examples.

Example 1

UE Procedure for Reporting HARQ-ACK

If the UE detects a DCI format 1_0 or a DCI format 1_1 scheduling a PDSCH reception ending in slot n or if the UE detects a DCI format 1_0 indicating an SPS PDSCH release through a PDCCH reception ending in slot n, the UE provides corresponding HARQ-ACK information in a PUCCH transmission within slot n'+k+$K_{offset}$, where k is a number of slots and is indicated by the PDSCH-to-HARQ-timing-indicator field in the DCI format, if present, or provided by dl-DataToUL-ACK. $K_{offset}$ is derived from broadcast information, e.g., broadcast system information, or dedicatedly signaled by higher layers, e.g., RRC message or MAC CE. n' refers to a slot number of the PUCCH derived by n'=$\lfloor n \cdot \mu^{PUCCH-\mu^{PDSCH}} \rfloor$.

For an SPS PDSCH reception ending in slot n, the UE transmits the PUCCH in slot n' K+k+$_{offset}$ where k is provided by the PDSCH-to-HARQ-timing-indicator field in DCI format 1_0 or, if present, in DCI format 1_1 activating the SPS PDSCH reception.

If the UE is not configured $K_{offset}$ and is scheduled with a PDSCH reception or activated for an SPS PDSCH reception ending in slot n, the UE provides corresponding HARQ-ACK+ACK information in a PUCCH transmission within slot n'+k+$K_{offset}^{default}$, where $K_{offset}^{default}$ is determined by common TA in broadcast system information in a serving cell, or is determined by one or multiple default value(s) defined in specifications.

Example 2

Type-1 HARQ-ACK Codebook Determination

This subclause applies if the UE is configured with pdsch-HARQ-ACK-Codebook=semi-static.

If the UE is provided pdsch-AggregationFactor, $N_{PDSCH}^{repeat}$ is a value of pdsch-AggregationFactor; otherwise, $N_{PDSCH}^{repeat}=1$. The UE reports HARQ-ACK information for a PDSCH reception from slot n−$N_{PDSCH}^{repeat}$+1 to slot n only in a HARQ-ACK codebook that the UE includes in a PUCCH or PUSCH transmission in slot n'+k+$K_{offset}$, where k is a number of slots and is indicated by higher layers or L1 signaling. If the UE reports HARQ-ACK information for the PDSCH reception in a slot other than slot n'k+$K_{offset}$, the UE sets a value for each corresponding HARQ-ACK information bit to NACK.

For a serving cell c, an active DL BWP, and an active UL BWP, the UE determines a set of $M_{A,c}$ occasions for candidate PDSCH receptions for which the UE can transmit corresponding HARQ-ACK information in a PUCCH in the slot $n_U$. If the serving cell c is deactivated, the UE uses as the active DL BWP for determining the set of $M_{A,c}$ occasions for candidate PDSCH receptions a DL BWP provided by firstActiveDownlinkBWP. The determination is based on a set of slot timing values $K_1$+$K_{offset}$ associated with the active UL BWP, where $K_1$ is provided by DCI format 1_0 or DCI format 1_1.

Example 3

Type-2 HARQ-ACK Codebook Determination

This subclause applies if the UE is configured with pdsch-HARQ-ACK-Codebook=dynamic.

A UE determines to monitor occasions for PDCCH with DCI format 1_0 or DCI format 1_1 for scheduling PDSCH receptions or SPS PDSCH release on an active DL BWP of a serving cell, and for which the UE transmits HARQ-ACK information in the same PUCCH in slot n' based on:

PDSCH-to-HARQ feedback timing values for PUCCH transmission with HARQ-ACK information in slot n' in response to PDSCH receptions or SPS PDSCH release.

slot offsets $K_0$ provided by time-domain resource assignment field in DCI format 1_0 or DCI format 1_1 for scheduling PDSCH receptions or SPS PDSCH release and by pdsch-AggregationFactor, when provided.

The timing offset value $K_{offset}$ for PUCCH transmission with HARQ-ACK information in slot n' in response to PDSCH receptions or SPS PDSCH release.

The following are one or more PUSCH related examples.

When the UE is scheduled to transmit a transport block and no CSI report, or the UE is scheduled to transmit a transport block and a CSI report(s) on PUSCH by a DCI, The slot n' where the UE shall transmit the PUSCH is determined by $K_2$ and $K_{offset}$ such that $n'=\lfloor n\cdot 2^{\mu_{PUCCH}-\mu_{PDCCH}}\rfloor + K_2+K_{offset}$, where n is the slot with the scheduling DCI, $K_2$ and $K_{offset}$ are based on the numerology of the scheduled PUSCH, and $\mu_{PUSCH}$ and $\mu_{PDCCH}$ are the subcarrier spacing configurations for PUSCH and PDCCH, respectively.

The following are one or more CSI related examples.

Example 1

CSI Report Configuration

For a semi-persistent or aperiodic CSI report on PUSCH, the allowed slot offsets are configured by the higher layer parameter reportSlotOffsetList and $K_{offset}$. The offset is selected in the activating/triggering DCI and from the timing offset $K_{offset}$ configured per BWP or per cell.

The selection rule for the higher layer parameter reportSlotOffsetList and $K_{offset}$ is specified below.

For semi-persistent reporting using PUSCH, the parameter reportSlotOffsetList provides timing offset Y. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot $n'+Y+K_{offset}$, the second report in $n'+Y+K_{offset}+P$, where P is the configured periodicity, $n'=\lfloor n\cdot 2^{\mu_{PUCCH}-\mu_{PDCCH}}\rfloor$ is the UL slot, and n is the DL slot of the scheduling.

For aperiodic reporting using PUSCH, Timing offset Y. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The report is transmitted in slot $n'+Y+K$ offset, where $n'=\lfloor n\cdot 2^{\mu_{PUCCH}-\mu_{PDCCH}}\rfloor$ refers to the UL slot, and n is the DL slot with the scheduling DCI.

Example 2

CSI Reference Resource

CSI Reference resource is used for channel quality indicator (CQI) derivation. If a UE is not configured with time restriction for interference measurements, the UE may derive the interference measurements for computing CSI value reported in uplink slot n' based on only the CSI-IM and/or NZP CSI-RS for interference measurement no later than the CSI reference resource associated with the CSI resource setting.

CSI reference resource is used for aperiodic, semi-persistent, and periodic CSI reporting.

The CSI reference resource for a serving cell is defined as follows.

In the frequency domain, the CSI reference resource is defined by the group of downlink physical resource blocks corresponding to the band to which the derived CSI relates.

In the time domain, the CSI reference resource for a CSI reporting in uplink slot n' is defined by a single downlink slot $n=n_{CSI\_REF}$, where $$n = \left\lfloor (n' - K_{offset})\cdot \frac{2^{\mu_{DL}}}{2^{\mu_{UL}}} \right\rfloor$$

and $\mu_{DL}$ and $\mu_{UL}$ are the SCS configurations for DL and UL, respectively;
where for periodic and semi-persistent CSI reporting
if a single CSI-RS/SSB resource is configured for channel measurement, the slot number of $n_{CSI\_REF}$ is the smallest value greater than or equal to $4\cdot 2^{\mu_{DL}}$, such that it corresponds to a valid downlink slot, or
if multiple CSI-RS/SSB resources are configured for channel measurement, the slot number of $n_{CSI\_REF}$ is the smallest value greater than or equal to $5\cdot 2^{\mu_{DL}}$, such that it corresponds to a valid downlink slot;
where for aperiodic CSI reporting, if the UE is indicated by the DCI to report CSI in the same slot as the CSI request, $n_{CSI\_REF}$ is such that the reference resource is in the same valid downlink slot as the corresponding CSI request, otherwise $n_{CSI\_REF}$ is the smallest value greater than or equal to Z', such that slot $n-n_{CSI\_REF}$ corresponds to a valid downlink slot, where Z' corresponds to the delay requirement.
A slot in a serving cell shall be a valid downlink slot if:
it comprises at least one higher layer configured downlink or flexible symbol, and
it does not fall within a configured measurement gap for that UE, and
it is not received later than the associated CSI reporting after the UE adjusts uplink timing for PUSCH/SRS/PUCCH transmission on all the serving cells in the TA group (TAG).
If there is no valid downlink slot for the CSI reference resource corresponding to a CSI Report Setting in a serving cell, CSI reporting is omitted for the serving cell in uplink slot n', and the associated CSI measurement may be omitted or terminated by a UE.

When periodic or semi-persistent CSI-RS/CSI-IM or SSB is used for channel/interference measurements, the UE is not expected to measure channel/interference on the CSI-RS/CSI-IM/SSB whose reception time of last OFDM symbol is received up to Z" symbols (in the same numerology of the associated CSI-RS/CSI-IM/SSB) before transmission time of the first OFDM symbol of the aperiodic CSI reporting, where Z" corresponds to the delay requirement related to UE processing time requirement.

Referring back to the additional/remaining NR procedures with transmission offset consideration, the following examples are provided.

Example 1

AP-SRS

For a UE configured with one or more SRS resource configuration(s), and when the higher layer parameter resourceType in SRS-Resource is set to 'aperiodic':
If the UE receives the DCI triggering aperiodic SRS in slot n, the UE transmits aperiodic SRS in each of the triggered SRS resource set(s) in slot $n'=K_{offset}$ where k" is configured via higher layer parameter slotOffset for each triggered SRS resources set and is based on the subcarrier spacing of the triggered SRS transmission, $\mu_{SRS}$ and l1PDCCH are the subcarrier spacing configurations for triggered SRS and PDCCH carrying the triggering command respectively.

Example 2

Secondary Cell Activation

With reference to slots for PUCCH transmissions, when a UE receives in a PDSCH an activation command for a secondary cell ending in slot n, the UE applies the corresponding actions no later than the minimum requirement and no earlier than slot n+k', except for the following:
 the actions related to CSI reporting on a serving cell that is active in slot n+k'
 the actions related to the sCellDeactivationTimer associated with the secondary cell that the UE applies in slot n+k'
 the actions related to CSI reporting on a serving cell which is not active in slot n+k' that the UE applies in the earliest slot after n+k' in which the serving cell is active The k' value is $k'=K_1+3 \cdot N_{slot}^{subframe,\mu}+1+K_{offset}$ where $K_1$ is a number of slots for a PUCCH transmission with HARQ-ACK information for the PDSCH reception and is indicated by the PDSCH-to-HARQ-timing-indicator field in the DCI format scheduling the PDSCH reception, and $N_{slot}^{subframe,\mu}$ a number of slots per subframe for the SCS configuration $\mu$ of the PUCCH transmission.

Example 3

Msg3 PUSCH Transmission and Retransmission

A UE transmits a transport block in a PUSCH scheduled by a RAR UL grant in a corresponding RAR message. Msg3 PUSCH retransmissions, if any, of the transport block, are scheduled by a DCI format 0_0 with CRC scrambled by a TC-RNTI provided in the corresponding RAR message.

With reference to slots for a PUSCH transmission scheduled by a RAR UL grant, if a UE receives a PDSCH with a RAR message ending in slot n for a corresponding PRACH transmission from the UE, the UE transmits the PUSCH in slot $n'+K_2+\Delta+K_{offset}$, where $K_2$ and $\Delta$ is provided by the higher layer parameters. The slot number is derived by $n'=\lfloor n \cdot 2^{\mu_{PUCCH}-\mu_{PDCCH}} \rfloor$.

The UE may assume a minimum time between the last symbol of a PDSCH reception conveying a RAR message with a RAR UL grant and the first symbol of a corresponding PUSCH transmission scheduled by the RAR UL grant is equal to X msec, where X is a time duration corresponding to UE processing capability and $K_{offset}$.

Referring back to the beam based $K_{offset}$ configurations (e.g., configuring $K_{offset}$ per beam), the following examples are provided.

Example 1

Associate $K_{offset}$ to a DL BWP

A UE is configured for operation in bandwidth parts (BWPs) of a serving cell by higher layers in a serving cell, e.g., with a set of four BWPs, for receptions by the UE in a DL bandwidth.

For each DL BWP in a set of BWPs, the UE is provided with the following parameters for the serving cell:
 A BWP index, e.g., BWP-Id, in the set of DL BWPs;
 a scheduling offset of $K_{offset}$;
 Rather than BWP configuration signaling, the $K_{offset}$ may be provided via DCI that gNB can request BWP switching via DCI with the $K_{offset}$. While receiving DCI with $K_{offset}$, the value will override the $K_{offset}$ once been configured via BWP configuration;
 If the $K_{offset}$ only appears in initial access BWP configuration (e.g., BWP-ID=0) and no any value be configured for other BWPs, the UE will assume the same $K_{offset}$ be applied while UE switches to the other BWPs.

The BWP index may be equal to or different from the beam index. The UE may use this assumption that the BWP index and the beam index are the same to recognize the beam-specific scheduling offset $K_{offset}$ from its activated DL BWP.

More specifically, in some implementations, if $K_{offset}$ is not present, the UE may apply the default value (e.g., which is broadcasting in SI or pre-specified) for per BWP or for per beam.

If $K_{offset}$ is received via dedicated signaling for a beam or for a BWP, the $K_{offset}$ is applied (by overwriting the one received via SI or the pre-specified one).

In some implementations, if $K_{offset}$ is not present, the UE may apply the value of the received TA as the value of the $K_{offset}$.

Example 2

Associate $K_{offset}$ to a DL SSB

A UE is configured with multiple DL SSBs (SS/PBCH blocks). In initial access, a beam can be estimated using the SSB. The association between beams and SSB indexes may be set up after UE is connected to NW.

An SSB index is determined by the index indicated in the DMRS of the SSB, or from PBCH payload bits, or from both SSB DMRS index and PBCH payload. An SSB index may be equal to or different from a beam index used for the transmission of the SSB signal associated with the SSB index. To recognize a beam-specific configuration, the UE may assume the SSB index and the beam index (beam can be interpreted by a spatial filter at the front end for shaping a transmission beam form) are the same. In other words, a beam may be associated with an SSB, and only associated with the SSB for a one-to-one mapping.

The UE may be configured with a set of multiple scheduling offset values of $K_{offset}$ in broadcast system information provided in a serving cell. For each value of $K_{offset}$, the UE is provided with an index of DL SSB to build an association. UE may select one of the offset values of $K_{offset}$ based on the associated DL SSB. In another implementation, the broadcasted system information may only contain one corresponding $K_{offset}$ upon the associated DL SSB and UE will directly apply the broadcasted value without selection.

In another implementation, a default value of $K_{offset}$ (e.g., sufficiently large enough) be used regardless of the camped beam. After RRC connection establishment completed, UE may send his preference $K_{offset}$ to gNB if some adjustment is identified (e.g., a powerful UE can have shorter processing time and he would like to shorten the delay). Note the preferred $K_{offset}$ could be per beam or per BWP. A MAC CE or RRC signaling could be used to indicate the UE's preference.

In another implementation, a default value of $K_{offset}$ (e.g., sufficiently large enough) be used regardless of camped beam. After RRC connection establishment completed, gNB will use dedicated RRC signaling or MAC CE to adjust the respective $K_{offset}$ on each SSB or BWP. Notice that delta signaling could be used that gNB only indicates the value offset between new configured $K_{offset}$ and default $K_{offset}$. For example, the default $K_{offset}$ is 16, and the new configure $K_{offset}$ is 12, then gNB signaling "4" to adjust them.

In another implementation, a few default values of $K_{offset}$ (e.g., sufficiently large enough) is pre-defined/pre-specified/pre-configured/configured. Individual values may correspond to individual scenarios which are featured with at least different propagation delay. UE may select one suitable value to be applied based on the scenario the UE resides. The scenario that the UE resides may be derived based on other parameters that are provided by BS (e.g., gNB). For example, gNB may provide the information on serving satellite type, e.g., GEO so that a correspondingly long offset value is selected. It is noted that in one method, the selection based on the above implementation does not depend on the camped BWP or depend on the selected SSB index.

Referring back to the solutions of signaling overhead reduction, the following are one or more HARQ related examples.

Referring back to signaling overhead reduction, the following examples are provided.

Example 1

Associate with TA

TA is sent by a base station to a UE. The UE uses the TA to advance or delay its timings of UL transmissions to compensate for propagation delay and align the transmissions from different UEs.

TA can be calculated by a round trip time (RTT) observed between the gNB (base station) and UE (device).

To reduce signaling overhead, the scheduling offset $K_{offset}$ may be determined by UE using the current TA value, for example, $K_{offset}=N_{TA}+\delta$, where
  the number $N_{TA}$ is the current TA updated by receiving timing advance commands from NW;
  $\delta$ denotes an additional offset indicated by NW in the serving cell or defined in the specifications;
  The numerology and slot format of $\delta$ may follow the ones of $N_{TA}$;
  The number NTA could be updated by receiving RAR from NW and a separate $\delta$ could be applied. For example, a larger (and default) $\delta$ be used while UE receives TA from RAR. Afterwards, a configured $\delta$ could be indicated by NW and be used for $K_{offset}$ determination while receiving TAC from NW.

To avoid scheduling disorder, $\delta$ may be set to be equal to or great than zero.

In some implementations, if a UE can predict TA based on its location and/or satellite ephemeris, the UE may report the predicted TA to a NW (e.g., by NW request). In another implementation, if a UE can predict TA based on UE location and/or satellite ephemeris, the NW may schedule $K_{offset}$ or the UE may derive $K_{offset}$ based on the predicted TA.

Example 2

Associate with Common TA

Common TA refers to a pre-compensation on the time (propagation) delay. It may be realized by indicating the common TA through broadcast system information received by all UEs in a serving cell. To determine the common TA, the closest point to the satellite on the Earth surface for a given beam may be used as a reference for TA, such that all users shall apply the common TA (reference TA), and the UE-specific TA.

A common TA can be calculated according to the RTT between a reference point to a base station (gNB), where the reference point may be
  the closest point within the beam;
  the beam center;
  the closet point within a cell, if multiple beams in a cell are present;
  the cell center, if multiple beams per cell.

To reduce signaling overhead, the scheduling offset $K_{offset}$ may be determined by
  UE using the common TA value, for example, $K_{offset}=N_{TA}^{common}+\delta$; where
    the number $N_{TA}^{common}$ is the common TA provided from NW in a serving cell;
    $\delta$ denotes an additional offset indicated by network or defined in the specifications;
    The numerology and slot format of $\delta$ follows the ones of $N_{TA}^{common}$.

To avoid scheduling disorder, $\delta$ may be set to be equal to or great than zero.

Figure 2:
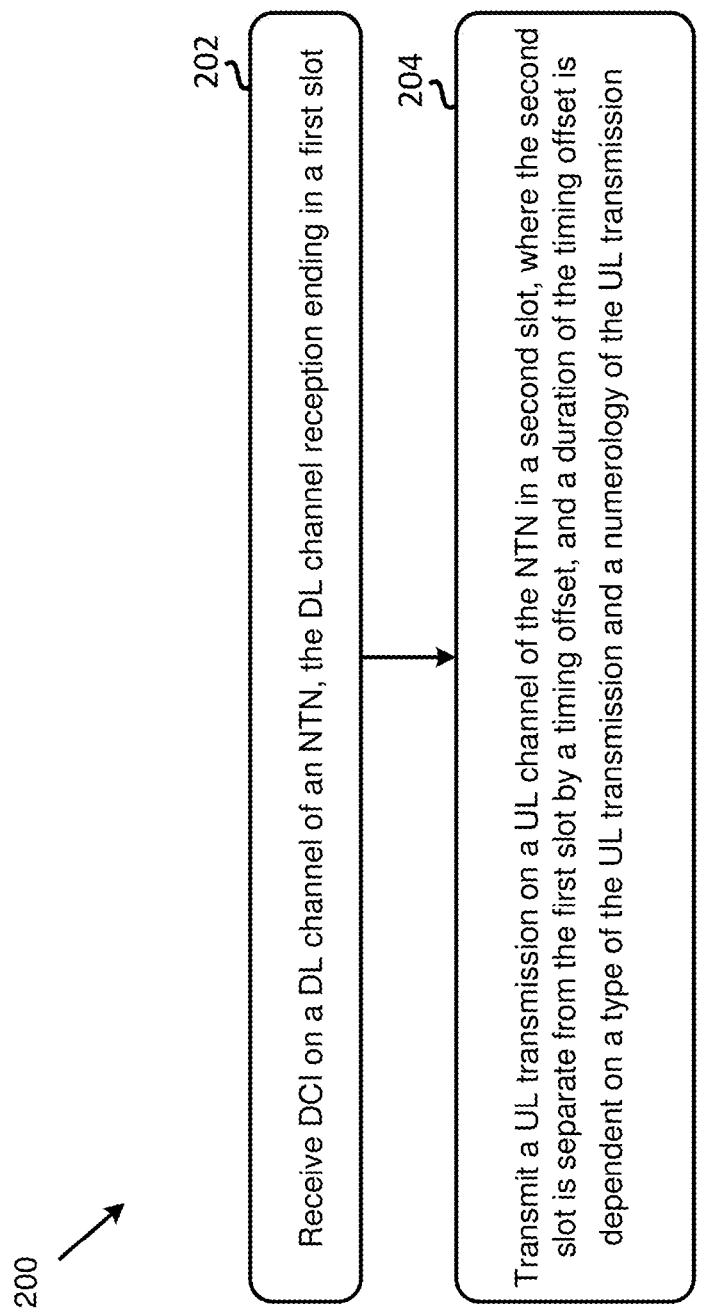
FIG. 2 illustrates a flowchart of a method performed by a UE, in accordance with an example implementation of the present disclosure.

FIG. 2 illustrates a flowchart of a method performed by a UE, in accordance with an example implementation of the present disclosure.

In flowchart 200, action 202 may include receiving DCI on a DL channel of an NTN, the DL channel reception ending in a first slot. Action 204 may include transmitting a UL transmission on a UL channel of the NTN in a second slot, where the second slot is separate from the first slot by a timing offset, and a duration of the timing offset is dependent on a type of the UL transmission and a numerology of the UL transmission.

In one implementation, the DL channel is a PDCCH, the UL channel is a PUCCH, the UL transmission includes a HARQ-ACK. The HARQ-ACK on the PUCCH is transmitted on slot $\lfloor n \cdot 2^{\mu_{PUCCH}-\mu_{PDCCH}} \rfloor + K_1 + K_{offset}$, the PDCCH reception ending in slot n, $\mu_{PUCCH}$ being a subcarrier spacing of the PUCCH, $\mu_{PDCCH}$ being a subcarrier spacing of the PDCCH, $K_1$ being an offset value indicated in the DCI, and $K_{offset}$ being an additional offset value for compensating a required timing advance (TA) and a processing delay for operation in the NTN.

In one implementation, the DL channel is a PDCCH, and the UL channel is a PUSCH. The UL transmission on the PUSCH is scheduled by the DCI, and is transmitted on slot $\lfloor n \cdot 2^{\mu_{PUCCH}-\mu_{PDCCH}} \rfloor + K_2 + K_{offset}$, the PDCCH reception ending in slot n, $\mu_{PUSCH}$ being a subcarrier spacing of the PUSCH, $\mu_{PDCCH}$ being a subcarrier spacing of the PDCCH, $K_2$ being an offset value based on a numerology of the PUSCH, and $K_{offset}$ being an additional offset value for compensating a required timing advance (TA) and a processing delay for operation in the NTN.

In one implementation, the DL channel is a PDCCH, the UL channel is a PUSCH, the UL transmission includes CSI. The CSI on the PUSCH is transmitted on slot $\lfloor n \cdot 2^{\mu_{PUCCH}-\mu_{PDCCH}} \rfloor + K + K_{offset}$, the PDCCH reception ending in slot n, $\mu_{PUSCH}$ being a subcarrier spacing of the PUSCH, $\mu_{PDCCH}$ being a subcarrier spacing of the PDCCH, K being an offset value indicated in the DCI, and $K_{offset}$ being an additional offset value for compensating a required timing advance (TA) and a processing delay for operation in the NTN.

In one implementation, the UL transmission includes CSI. A CSI reference resource is provided in the DL transmission in slot n−n$_{CSI\_ref}$, where $$n = \left\lfloor (n' - K_{offset}) \cdot \frac{2^{\mu_{DL}}}{2^{\mu_{UL}}} \right\rfloor,$$

n$_{CSI\_ref}$ being an offset value determined by the UE, the CSI transmission being in slot n', $\mu_{DL}$ being a subcarrier spacing of the DL channel, $\mu_{UL}$ being a subcarrier spacing of the UL channel, and K$_{offset}$ being an additional offset value for compensating a required timing advance (TA) and a processing delay for operation in the NTN.

In one implementation, the DCI is received in slot n, the DCI triggering aperiodic Sounding Reference Signal (SRS) transmissions. The UL transmission includes the aperiodic SRS transmissions in each of the triggered aperiodic SRS resource sets in slot $$\left\lfloor n \cdot 2^{\frac{\mu_{SRS}}{\mu_{PDCCH}}} \right\rfloor + k + K_{offset},$$

the DCI triggering the aperiodic SRS transmissions ending in slot n, $\mu_{SRS}$ being a subcarrier spacing of the triggered SRS transmission, $\mu_{PDCCH}$ being a subcarrier spacing of the PDCCH, K being an offset value indicated in the DCI, and K$_{offset}$ being an additional offset value for compensating a required timing advance (TA) and a processing delay for operation in the NTN.

In one implementation, the DL channel is a PDSCH having a Random Access Response (RAR) message ending in slot n, the RAR message being response to a Physical Random Access Channel (PRACH) preamble transmitted by the UE. The UL channel is a PUSCH. The UL transmission includes at one transport block (TB). The TB on the PUSCH is transmitted in slot n'+K$_2$+Δ+K$_{offset}$, where n'=n·2$^{\mu_{PUSCH}-\mu_{PDSCH}}$ being a subcarrier spacing of the PUSCH, $\mu_{PDCCH}$ being a subcarrier spacing of the PDCCH, K$_2$ being an offset value based on a numerology of the PUSCH, Δ being an additional subcarrier spacing specific slot delay value for a first transmission of the PUSCH scheduled by the RAR message, and K$_{offset}$ being an additional offset value for compensating a required timing advance (TA) and a processing delay for operation in the NTN.

As discussed above, TA ensures time alignment at the receiver side, in order to avoid uplink transmissions received from different devices within a cell causing excessive interference to each other. A requirement for this uplink orthogonality to hold is that the uplink slot/symbol boundaries for given numerology are time-aligned within a certain threshold at the base station. Ideally, any timing misalignment between received signals should fall within the cyclic prefix.

In NR, the TA is derived from the uplink (UL) received timing and sent by a base station (e.g., gNB) to a UE. The following are two ways for the base station to provide timing advance to the UE. The first one is an initial timing advance during random access procedure. The base station derives the timing advance by measuring the received random access preamble and sends the (absolute) value to the UE via the Timing Advance Command field in MAC RAR.

The maximum timing advance in NR which can be compensated during initial access is calculated in the following:
2 ms, for subcarrier spacing (SCS)=15 kHz;
1 ms, for SCS=30 kHz;
0.5 ms, for SCS=60 kHz;
0.27 ms, for SCS=120 kHz;
0.15 ms, for SCS=240 kHz.

The second one is timing advance refinement in RRC_CONNECTED. The base station derives the timing advance by measuring the UL transmission and refines the timing advance (differential value) via the Timing Advance Command MAC CE.

The maximum timing advance which can be adjusted via Timing Advance Command is calculated in the following:
0.017 ms, for subcarrier spacing (SCS)=15 kHz;
0.008 ms, for SCS=30 kHz;
0.004 ms, for SCS=60 kHz;
0.002 ms, for SCS=120 kHz;
0.001 ms, for SCS=240 kHz.

In an NTN, the maximum round trip delay is 541.46 ms for GEO and 25.77 ms for LEO. The timing advance in NR as calculated above is far from sufficient.

More specifically, the 3GPP has made the following agreement.

---

Agreement in RAN1#98

---

Following options can be considered to support TA adjustment for UL transmission:
  Option 1
    Autonomous acquisition of the TA at UE with known
    location and satellite ephemeris:
      FFS: how to compensate the TA, e.g., full TA or only
      UE-specific differential TA
        Note: If only UE-specific differential TA is compensated,
        timing offset between gNB DL and UL frame should be
        managed by network and acquisition of common TA is
        needed.
      FFS: additional TA signaling from BS considering the
      potential inaccuracy.
  Option 2
    Indication of common TA to all users within the coverage of the
    same beam with broadcasting as a baseline for signaling,
    e.g., via SIB/MIB
      FFS: additional UE-specific differential TA signaling from BS.
      FFS: the reference point(s) for common TA calculation
    Additional enhancements to existing TA signaling in Rel-15
    can be considered for TA maintenance
      Parameters indicated by gNB to enable the TA adjustment
      Cell/UE-group specific signalings

---

To cover the propagation delay, introducing a new common TA value has been discussed. Implementations of the present disclosure provides for UE specific differential TA and how to define the common TA value (which reference point shall be used for calculation).

NTNs may need to support UEs from different altitudes. For this, a consideration on the UE height for the common TA calculation was highlighted. For example, UEs on a flight may have 20 km height above the earth's surface, which affects how to calculate the common TA if a reference point is defined by the shortest distance between a device and a base station.

However, the common TA should not be calculated based on a reference point above the sea level or on a flight due to the following reasons. Aeroplane mounted UEs or UE on a flight may not be the majority among the serving UEs. In general, more UEs may be served on the ground with an altitude closed to the sea level. Since the common TA is broadcast to all UEs in a serving cell, the reference point shall be based on where the majority UEs locate.

For most aircraft that can fly at 20 km, some instruments for measurement are necessary, for example, the location shall be provided by Global Navigation Satellite System (GSNN), and the altitude might be determined using a radar altimeter or a sensitive altimeter. Therefore, for aeroplane mounted UEs, if the altitude information is provided, the common TA value can be further refined autonomously.

If the reference point is calculated based on the sea level, the following question is that how and when aeroplane-mounted UEs are able to fine-tune the TA value based on the common TA, and how this new TA mechanism coexists with the TA framework in NR.

To simplify the following discussion, in various implementations of the present disclosure, the TA value is expressed with the following contributors:

$$NTA = Ncommon + NUE\_correct + NNW\_correct$$

where
NTA refers to the total TA value for UE to decide a UL timing. This value may only relate to the propagation delay;
Ncommon refers to the common TA value broadcast per cell or per BWP;
NUE_correct refers to a TA correction calculated by UE with side information. The side information may be from the network (NW) and/or UE itself;
NNW_correct refers to a TA correction indicated by NW via random access response (RAR) and/or Timing Advance Command MAC CE.

For these contributors, another issue is that there is no clear value boundary and use cases, (e.g., for PRACH, RAR related, or RRC_CONNECTED) described in the agreement.

For example, two options in the agreement can be operated in the following description:
Option 1 may use UE TA correction only with neither the common TA nor the NW TA correction;
Option 2 may use the common TA only with neither NW TA correction nor UE TA correction.

In the current 3GPP specification, neither options (option 1 or 2) is optimal with consideration of using the three contributors. Especially for Option 2, it appears that UE TA correction is not allowed. This restriction may put a strong degradation on the PRACH procedure, forcing a base station to use a larger interval between two consecutive PRACH preamble occasion (RO) for the maximum delay difference within the cell.

To handle the above-mentioned issues, implementations of the present disclosure provide the following solutions.

In various implementations of the present disclosure, one or more solutions are provided to apply TA during PRACH procedures.

Figure 3:
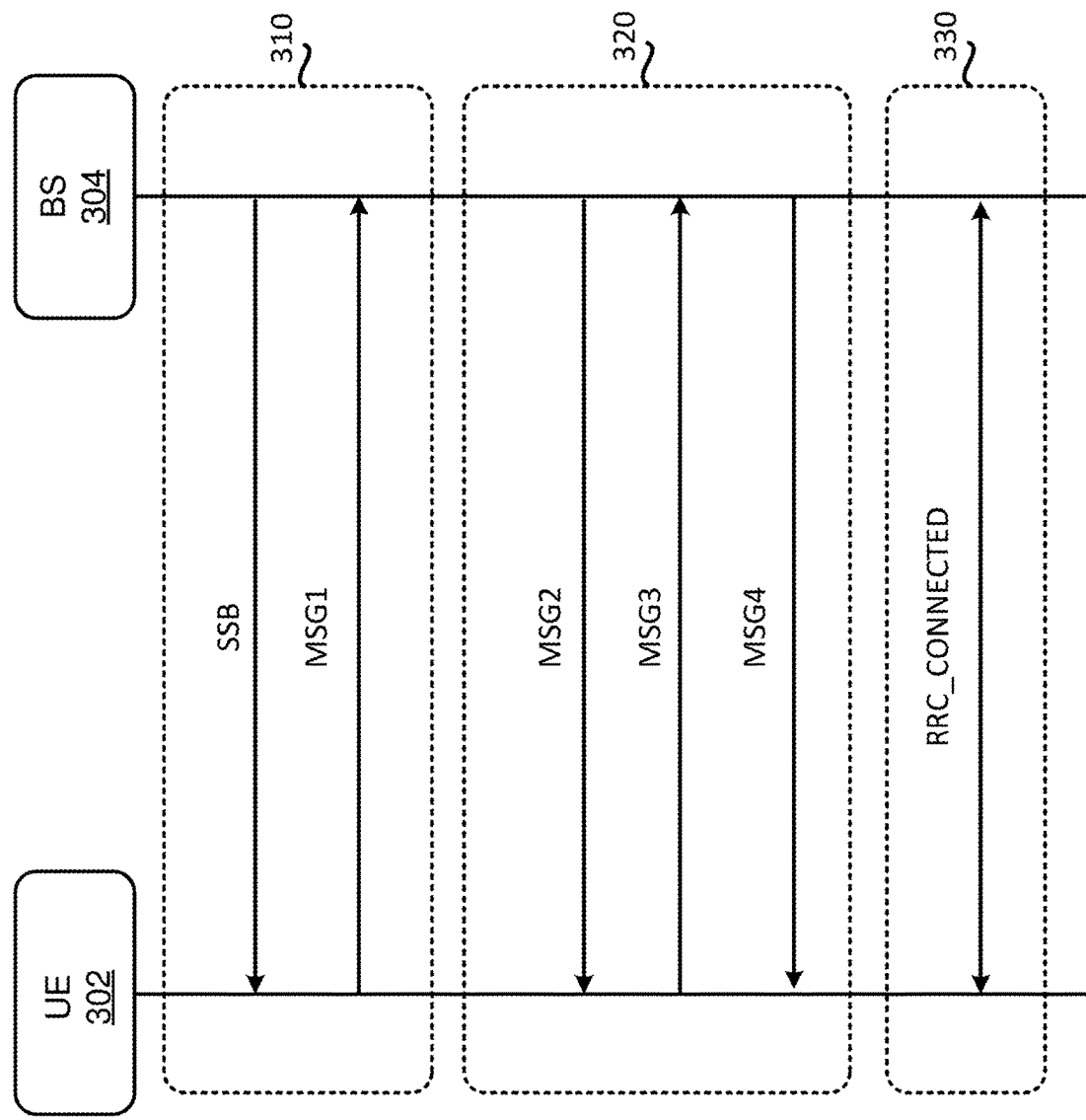
FIG. 3 illustrates a framework on a 4-step random access procedure, in accordance with an example implementation of the present disclosure.

As shown in FIG. 3, large propagation delay scenarios such as NTN may result during RACH procedure 310. The PRACH related procedure includes DL SSB and the Random-Access Preamble (Msg1). A UE may determine a DL reference timing based on measurement(s) performed on a DL SSB and apply the common TA carried in e.g., system information associated with the SSB. The UE then applies the TA to transmit Msg1.

Since there is no NW correction during PRACH, the TA for Msg1 can be written by $$NTA = Ncommon + NUE\_correct$$

where
Ncommon is derived from some information indicated from NW related to a reference point, satellite ephemeris, Satellite orbit, satellite types (transparent or regenerative), and ground station position (if the satellite is transparent). Ncommon may be broadcasted by system information, and UE applies it directly.
A reference point can be defined as:
a point on the earth surface (or 20 km above the ground) within a beam (or a cell with multiple beams), being the shortest distance between the point and the gNB within the beam (the cell).
a point on the earth surface (or 20 km above) at a center of a beam (or a cell).
Satellite ephemeris gives the trajectory of satellites in the sky, i.e., the position (and possibly velocity) over time.
Satellite types include transparent and regenerative.
Transparent means gNB is on the ground and satellites are transparent to UEs.
Regenerative means gNB is on satellites.
Satellite orbit means LEO, MEO or GEO.
LEO is around 600 km or 1200 km above the ground.
MEO is around 1500 km above the ground.
GEO is 35786 km above the ground.
Ground station position means gNB position on the ground when transparent satellites are deployed.
NUE_correct is derived by UE from information indicated from NW related to a reference point, satellite ephemeris, Satellite orbit, satellite types (transparent or regenerative), and ground station position (if the satellite is transparent). Also, UE may acquire information on altitude, latitude based on GNSS signal. UE may also derive an elevation angle with respect to a concerned satellite based on e.g., RS signal reception from the concerned satellite.
UE altitude may be used to estimate a timing difference between UE location and a reference point.
UE latitude may be used with the elevation angle and a satellite orbit to estimate a distance between UE location and a satellite.
UE may use both Ncommon and NUE_correct to derive a TA value.
UE altitude may be used to calculate a height correction relative to the reference point in Ncommon. The height correction is translated into a TA correction term and is included in $N_{UE\_correct}$. In some implementation, the TA correction term associated with the height correction is the only contributing component to $N_{UE\_correct}$.
Limitation on NUE_correct value range may be derived based on the following principles. It is noted that the value rage above may correspond to a PRACH detection window at NW side.
Based on a serving cell size and height correction (e.g., UE altitude relative to a reference point), which is related to:
The maximum differential delay in a cell.
The maximum altitude, e.g., 20 km above the sea level. In one example, a reference point is somewhere close to sea level and for an aeroplane, the height correction term results in a negative value.
Take LEO-600 for example, a range of NUE_correct may be from −0.4 ms to 6.24 ms.
For both ways to limit NUE_correct, the value range may be specified in specs, or be broadcast to UEs in system information (SI) carried by the SSB.

It is noted that a beam may be associated with a BWP. In this sense, beam(s) may be transparent to UEs and beam-specific parameters may be provided in a BWP-specific manner.

In various implementations of the present disclosure, one or more solutions are provided to apply TA during RAR related procedures.

As shown in FIG. 3, the RAR related procedure 320 includes the Random-Access Response (RAR) message (Msg2), Msg3, and Msg4. A UE may receive a TA command in Msg2, a.k.a. the TA command carried in RAR MAC CE. The UE then applies the TA to transmit Msg3.

Therefore, the TA for Msg3 can be written by:

$$NTA=NMsg1+NUE\_correct+NNW\_correct$$

where
- NMsg1 is the TA value used to transmit Msg1, which may include common TA and/or NUE_correct in Section 2.3.1;
- NNW_correct refers to the TA by NW measuring the received random access preamble and sends the value to UE via the Timing Advance Command field in MAC RAR;
- NUE_correct is derived by UE from information indicated from NW related to a reference point, satellite ephemeris, Satellite orbit, satellite types (transparent or regenerative), and ground station position (if the satellite is transparent). Also, UE may acquire information on altitude, latitude based on GNSS signal. UE may also derive an elevation angle with respect to a concerned satellite based on e.g., RS signal reception from the concerned satellite. In some implementations, only part of the above information may be applied for deriving this term. In other implementation, this term may not be included for msg-3 transmission.
  - For example, NUE_correct may be derived only using UE trajectory and satellite ephemeris for a TA prediction, considering propagation delay, based on NMsg1 and NNW_correct.
  - For example, some information used in Msg1 transmission is not allowed to be used again such as UE altitude, elevation angle, the reference point, Satellite orbit, satellite types, and ground station position.
  - For example, information related to UE altitude is not used again for deriving $N_{UE\_correct}$ for msg-3 transmission.

Limitation on NUE_correct value range may be derived based on the following principles.
- Based on a serving cell size and/or UE altitude, which is related to
  - The maximum differential delay in a cell specified in TS 38.811 and TS 38.821.
  - The maximum UE altitude, e.g., 20 km above the sea level.
- Based on the maximum TA value, e.g., NUE_correct may less than or equal to 2 ms for 15 kHz.

For the limitation of using NUE_correct, the valid value range may be defined in specs, or be indicated to UEs via Msg2.

In various implementations of the present disclosure, one or more solutions are provided to apply TA during RRC_CONNECTED related procedures.

As shown in FIG. 3, the RRC_CONNECTED procedure 330 includes transmission after Msg4. A UE may receive a TA command in RRC messages as Timing Advance Command MAC CE. The UE then applies the TA to transmit UL data. Therefore, the TA for UL transmission can be written by:

$$NTA=NPrevious\_TA+NUE\_correct+NNW\_correct$$

where
- NPrevious_TA is the TA value used for the previous UL transmit, e.g., Msg4 in FIG. 1, PUCCH/PUSCH/SRS.
- NNW_correct refers to the differential TA gNB derived by measuring the UL transmission. The differential timing advance may be signaled via the Timing Advance Command MAC CE.
- NUE_correct is derived by UE from information indicated from NW related to a reference point, satellite ephemeris, Satellite orbit, satellite types (transparent or regenerative), and ground station position (if the satellite is transparent). Also, some information may be obtained by UE related to GNSS including altitude and latitude, and an elevation angle from SSB reception. In some implementations, only part of the above information may be applied for deriving this term.
  - For example, NUE_correct may be derived only using UE trajectory and satellite ephemeris for a TA prediction, based on NPrevious_TA and NNW_correct.
  - For example, some information used in Msg1 transmission is not allowed to be used again such as UE altitude, elevation angle, the reference point, Satellite orbit, satellite types, and ground station position.
  - For example, information related to UE altitude is not used again for deriving $N_{UE\_correct}$ for PUCCH/PUSCH/SRS transmission.

Limitation on NUE_correct value range may be derived based on the following principles.
- Based on a serving cell size and/or UE altitude, which is related to:
  - The maximum differential delay in a cell specified in TS 38.811 and TS 38.821.
  - The maximum altitude, e.g., 20 km above the sea level.
- Based on the maximum value of a TA command, e.g., 0.0017 ms for SCS=15 kHz.

For the limitation of the value range of NUE_correct, the value range may be specified in specs, or be indicated to UEs via a TA command MAC CE.

The UE may report capability on using NUE_correct. NW may enable or disable UE to use NUE_correct via physical layer or MAC layer signaling, e.g., DCI or MAC CE, or higher layers messages, e.g., RRC.

NW may broadcast one or multiple of the following information for TA calculation:
- Satellite Scenarios: GEO, MEO, LEO.
- Satellite Altitude: 35,786 km, 600 km, 1,200 km.
- Payload: Transparent (including radiofrequency function only), regenerative (including all or part of RAN functions).
- Inter-Satellite link: Yes, No.
- Earth-fixed beams: Yes (steerable beams), No (the beams move with the satellite).
- Max beam footprint size (edge to edge) regardless of the elevation angle: 3500 km, 1000 km.
- Max Round Trip Delay (propagation delay only):
  - Scenario A: 541.46 ms (service and feeder links).
  - Scenario B: 270.73 ms (service link only).
  - Scenario C: (transparent payload: service and feeder links)
    - 25.77 ms (600 km)
    - 41.77 ms (1200 km)

Scenario D: (regenerative payload: service link only)
12.89 ms (600 km)
20.89 ms (1200 km)
Max delay variation within a beam (earth fixed user equipment): 16 ms, 4.44 ms (600 km), 6.44 ms (1200 km).
Max differential delay within a cell: 10.3 ms, 3.12 ms and 3.18 ms for respectively 600 km and 1200 km altitude.

Figure 4:
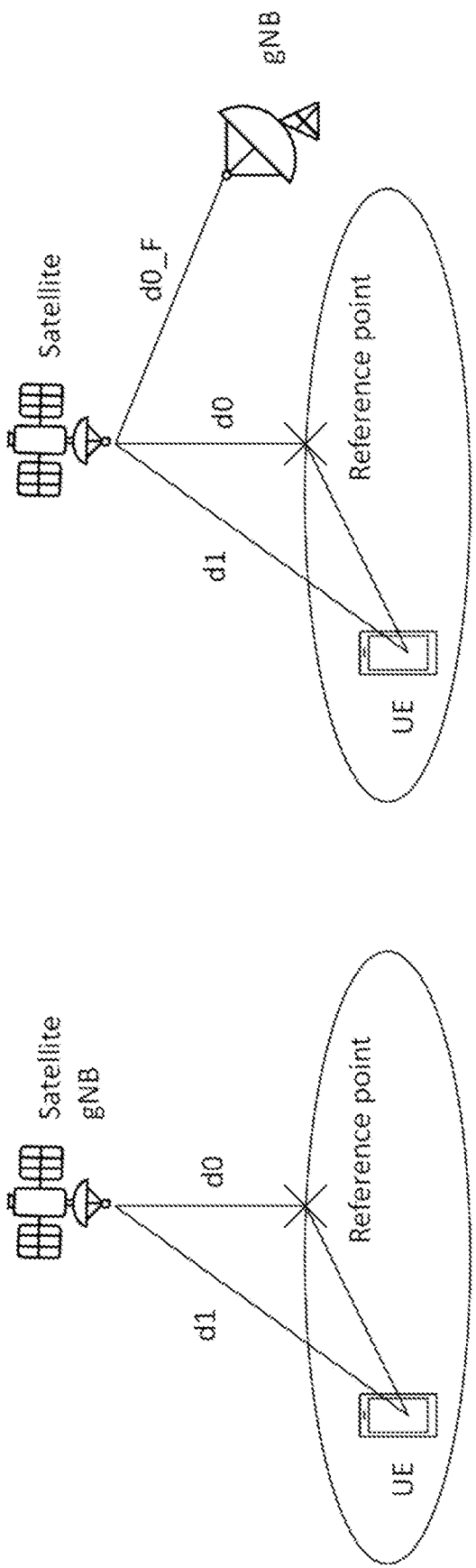
FIG. 4 illustrates a diagram for common TA and UE specific TA calculation, in accordance with various implementations of the present disclosure.

FIG. 4 illustrates a diagram for common TA and UE specific TA calculation, in accordance with various implementations of the present disclosure. As shown in FIG. 4, the value of common TA is determined by d0 for regenerative payload (in Case A) and d0+d0_F for bent-pipe payload while the value of UE specific TA is determined by d1−d0 (in Case B).

During the random-access procedure, broadcasting a common TA or extending the value range of the existing TA offset broadcast in system information (SI) is the baseline for initial timing advance. The UE specific TA is compensated via the Timing Advance Command field in random access response.

Figure 5:
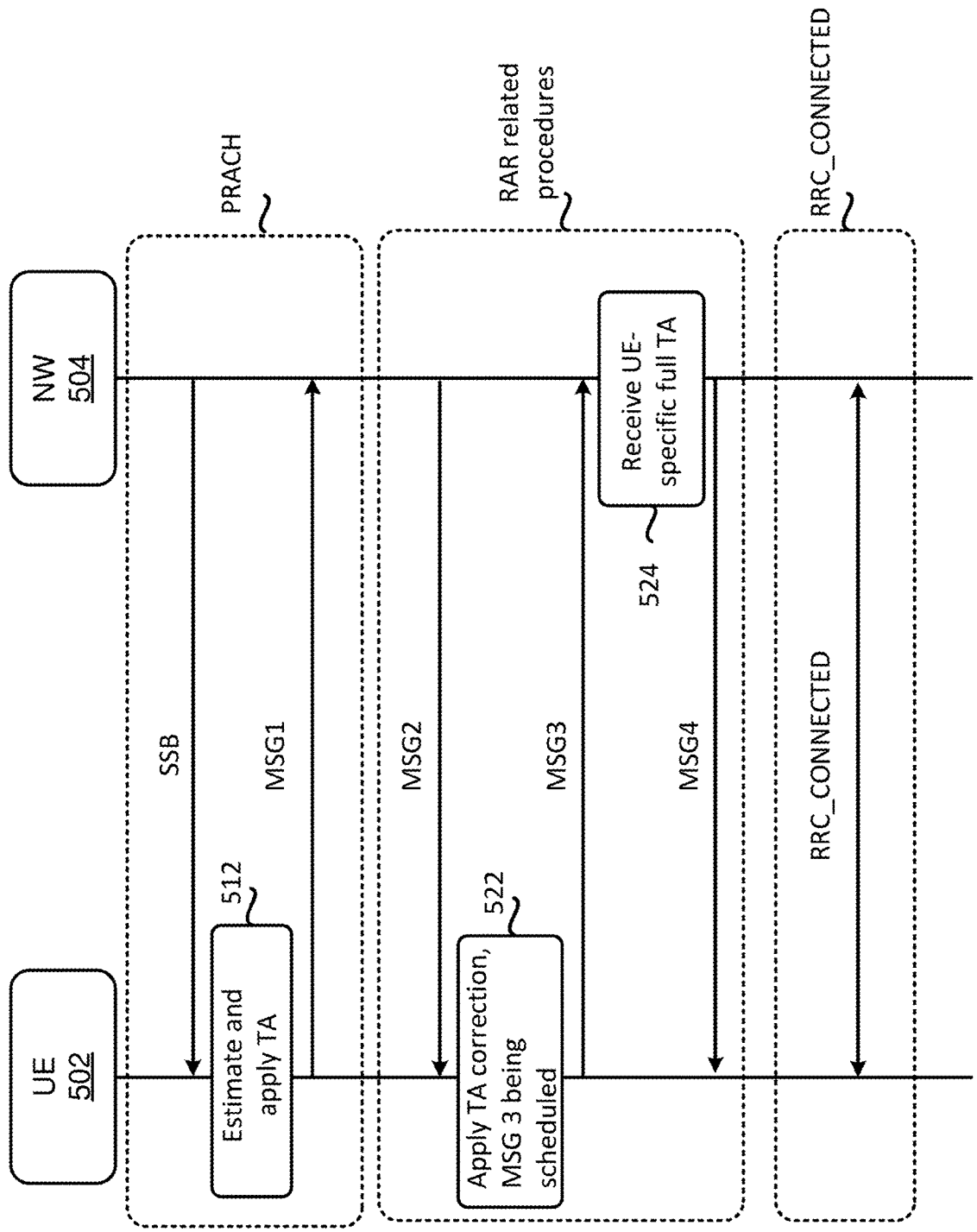
FIG. 5 illustrates a framework on a 4-step random access procedure with TA application, in accordance with an example implementation of the present disclosure.

FIG. 5 illustrates a framework on a 4-step random access procedure, in accordance with an example implementation of the present disclosure. The following framework may be an example for UE to perform initial timing advance during the 4-step random access procedure.

As illustrated in FIG. 5, in action 512, an estimation and application of the timing advance with respect to the satellite before a UE (e.g., UE 502) sending Msg1 (e.g., Random-Access Preamble) to a network (e.g., NW 504).

The TA value sending Msg1 denoted by NTA can be written by NTA=Ncommon+NUE_correct, where Ncommon refers to the value of the common TA broadcasted by NW in system information and NUE_correct refers to UE TA correction based on some side information.

The side information for the UE TA correction may be from UE and/or NW.

From UE, there is GNSS information, providing UE altitude and UE latitude, and there is angle of arrival (Aloe) measurement, for determining the direction of propagation of a radio wave incident on an antenna array.

From NW, there is satellite ephemeris, satellite orbit, satellite types (transparent or regenerative), satellite beam size or the maximum differential delay in a cell, and ground station position (if the satellite is transparent).

The TA correction by UE may have a restriction from NW or defined in specifications.

From NW, there may be a higher layers parameter or an information element (IE) broadcasted in system information to indicate whether TA correction by UE is allowed or is supported in a serving cell.

From NW, there may be a higher layer parameter or an IE broadcasted in system information to indicate a certain range of valid TA correction for UE, e.g., the minimum TA correction is −5 ms, and the maximum TA correction is 5 ms, meaning NW expects that UE applies a corrected TA value between (Ncommon−5 ms) and (Ncommon+5 ms). Any TA value not included in this range is not allowed.

From specs, the restriction can be associated with the maximum differential delay of the serving cell.

In Msg2, when the UE 502 receives the RAR, it applies a TA correction for the UE-based estimation.

The timing advance correction via the Timing Advance Command field in MAC RAR may be associated with or may include a new parameter for setting different step sizes for TA correction.

The TA correction may be extended to use negative values for the UE-based estimation.

The network schedules Msg3 without knowing the absolute value of the timing advance. This can be solved by for instance: Using the maximum differential delay of the cell to schedule the UE, in action 522.

The network receives Msg3 and gets to know the timing advance of the UE. At this point (e.g., in action 524), both UE and network are both aware of the UE-specific timing advance.

The TA value for sending Msg3 is written by NTA=NMsg1+NUE_correct+NNW_correct, where:
NMsg1 is the TA value used for sending Msg1;
NNW_correct is the TA correction received in Msg2;
NUE_correct refers to UE TA correction or TA prediction mainly derived from information of UE trajectory and satellite ephemeris but also related to some side information.

The side information for the UE TA correction may be from UE and/or NW.

From UE, there is GNSS information, providing UE altitude and UE latitude, and there is angle of arrival (AoA) measurement, for determining the direction of propagation of a radio wave incident on an antenna array.

From NW, there is a common TA value, satellite ephemeris, satellite orbit, satellite types (transparent or regenerative), satellite beam size or the maximum differential delay in a cell, and ground station position (if the satellite is transparent).

The TA correction by UE may have a restriction from NW or defined in specifications.

From NW, there may be a higher layers parameter in Msg2 or an information element (IE) broadcasted in system information to indicate whether TA correction by UE is allowed or is supported in a serving cell.

From NW, there may be a higher layer parameter in Msg2 or in system information, e.g., an IE in system information to indicate a certain range of valid TA correction for UE, e.g., the minimum TA correction is −5 ms, and the maximum TA correction is 5 ms, meaning NW expects that UE applies a corrected TA value between (NMsg1+NNW_correct−5 ms) and (NMsg1+NNW_correct+5 ms). Any TA value not included in this range is not allowed.

From specs, the restriction can be associated with the maximum differential delay of the serving cell.

From specs, the restriction can be associated with the maximum value of a TA command in Msg2, e.g., 2 ms for SCS=15 kHz.

After Msg4, NW performs TA maintenance by measuring the UL transmission from a UE and refines the timing advance via the Timing Advance Command MAC CE indicating to the UE.

The TA value for sending UL transmission is by NTA=NPrevious TA+NUE_correct+NNW_correct, where:
NPrevious_TA is the TA value used for sending the previous UL transmission;
NNW_correct is the TA correction received for NW via TA command MAC CE;
NUE_correct refers to UE TA correction or UE TA prediction mainly derived from information of UE trajectory and satellite ephemeris but also related to some side information.

The side information for the UE TA correction may be from UE and/or NW:
- From UE, there is GNSS information, providing UE altitude and UE latitude, and there is angle of arrival (AoA) measurement, for determining the direction of propagation of a radio wave incident on an antenna array.
- From NW, there is a common TA value, satellite ephemeris, satellite orbit, satellite types (transparent or regenerative), satellite beam size or the maximum differential delay in a cell, and ground station position (if the satellite is transparent).

The TA correction by UE may have a restriction from NW or defined in specifications.
- From NW, there may be a higher layers parameter in RRC messages or an information element (IE) broadcasted in system information to indicate whether TA correction by UE is allowed or is supported in a serving cell.
- From NW, there may be a higher layer parameter in RRC messages or in system information, e.g., an IE in system information to indicate a certain range of valid TA correction for UE, e.g., the minimum TA correction is −5 ms, and the maximum TA correction is 5 ms, meaning NW expects that UE applies a corrected TA value between (NPrevious_TA+NNW_correct−5 ms) and (NPrevious_TA+NNW_correct+5 ms). Any TA value not included in this range is not allowed.
- From specs, the restriction can be associated with the maximum differential delay of the serving cell.
- From specs, the restriction can be associated with the maximum value of a TA command in MAC CE, e.g., 0.0017 ms for SCS=15 kHz.

Figure 6:
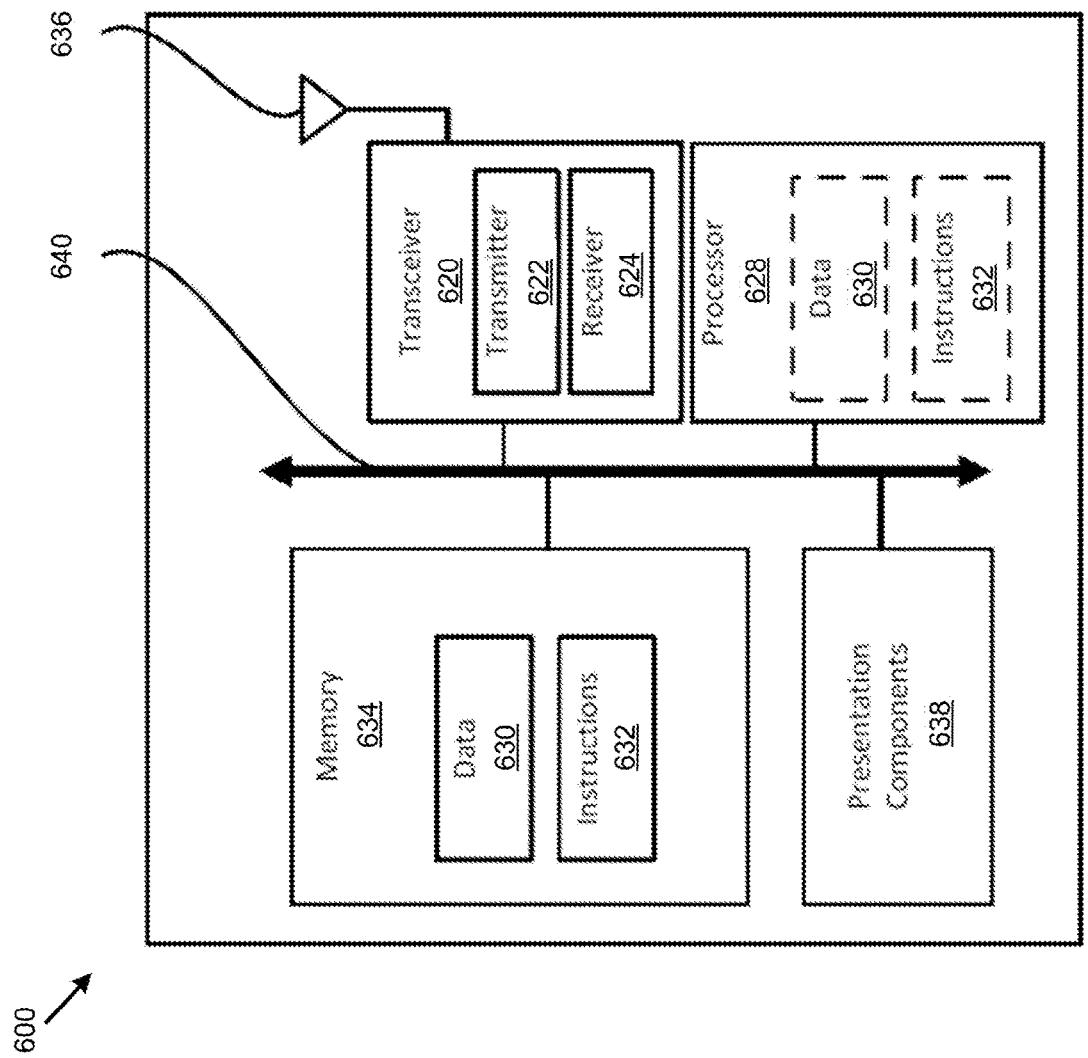
FIG. 6 is a block diagram illustrating a node for wireless communication, according to various aspects of the present disclosure.

FIG. 6 is a block diagram illustrating a node for wireless communication, according to various aspects of the present disclosure. As illustrated in FIG. 6, a node 600 may include a transceiver 620, a processor 628, a memory 634, one or more presentation components 638, and at least one antenna 636. The node 600 may also include a radio frequency (RF) spectrum band module, a BS communications module, a network communications module, and a system communications management module, Input/Output (I/O) ports, I/O components, and a power supply (not illustrated in FIG. 6).

Each of the components may directly or indirectly communicate with each other over one or more buses 640. The node 600 may be a UE or a BS that performs various functions disclosed with reference to FIGS. 2 through 5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including but not limited to usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory may include solid-state memory, hard drives, optical-disc drives, etc. As illustrated in FIG. 6, the memory 634 may store computer-readable, computer-executable instructions 632 (e.g., software codes) that are configured to cause the processor 628 to perform various functions disclosed herein, for example, with reference to FIGS. 2 through 5. Alternatively, the instructions 632 may not be directly executable by the processor 628 but be configured to cause the node 600 (e.g., when compiled and executed) to perform various functions disclosed herein.

The processor 628 (e.g., having processing circuitry) may include an intelligent hardware device, e.g., a Central Processing Unit (CPU), a microcontroller, an ASIC, etc. The processor 628 may include memory. The processor 628 may process the data 630 and the instructions 632 received from the memory 634, and information transmitted and received via the transceiver 620, the baseband communications module, and/or the network communications module. The processor 628 may also process information to be sent to the transceiver 620 for transmission via the antenna 636 to the network communications module for transmission to a core network.

One or more presentation components 638 may present data indications to a person or another device. Examples of presentation components 638 may include a display device, a speaker, a printing component, and a vibrating component, etc.

In view of the disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE), comprising:
one or more non-transitory computer-readable media storing one or more computer-executable instruction; and
at least one processor coupled to the one or more non-transitory computer-readable media, the at least one processor configured to execute the one or more computer-executable instructions to:
receive downlink control information (DCI) on a downlink (DL) channel in a non-terrestrial network (NTN), the DL channel being received in a first slot; and
perform an uplink (UL) transmission on a UL channel of the NTN in a second slot separated from the first slot by a timing offset, wherein:
in a case where the DCI is to trigger at least one aperiodic Sounding Reference Signal (SRS) transmission:
the UL transmission includes the at least one triggered aperiodic SRS transmission in at least one triggered aperiodic SRS resource set, and
a duration of the timing offset is determined based on a combination of ( ) a subcarrier spacing of the at least one triggered aperiodic SRS transmission, ii a subcarrier spacing of the DL channel, (iii) a configured offset value that is configured through RRC signaling to indicate a slot for the at least one triggered aperiodic SRS transmission, and (iv) an additional offset that is added to a required timing advance (TA) to compensate for a processing delay due to operation in the NTN.

2. The UE of claim 1, wherein:
the DL channel is a Physical Downlink Control Channel (PDCCH);
the UL channel is a Physical Uplink Control Channel (PUCCH);
the UL transmission includes a Hybrid Automatic Repeat Request (HARQ)-Acknowledgement (ACK); and
the HARQ-ACK on the PUCCH is transmitted on the second slot $\lfloor n \cdot 2^{\mu_{PUCCH}-\mu_{PDCCH}} \rfloor + K_1 + K_{offset}$, wherein:
the PDCCH is received in the first slot n,
$\mu_{PUCCH}$ is a subcarrier spacing of the PUCCH,
$\mu_{PDCCH}$ is a subcarrier spacing of the PDCCH,
$K_1$ is an offset value indicated in the DCI, and
$K_{offset}$ is the additional offset.

3. The UE of claim 1, wherein:
the DL channel is a Physical Downlink Control Channel (PDCCH);
the UL channel is a Physical Uplink Shared Channel (PUSCH); and
the UL transmission on the PUSCH is scheduled by the DCI, and is transmitted on the second slot $\lfloor n \cdot 2^{\mu_{PUCCH}-\mu_{PDCCH}} \rfloor + K_2 + K_{offset}$, wherein:
the PDCCH is received in the first slot n,
$\mu_{PUSCH}$ is a subcarrier spacing of the PUSCH,
$\mu_{PDCCH}$ is a subcarrier spacing of the PDCCH,
$K_2$ is an offset value based on a numerology of the PUSCH, and
$K_{offset}$ is an offset.

4. The UE of claim 1, wherein:
the DL channel is a Physical Downlink Control Channel (PDCCH);
the UL channel is a Physical Uplink Shared Channel (PUSCH);
the UL transmission includes Channel State Information (CSI); and
the CSI on the PUSCH is transmitted on the second slot $\lfloor n \cdot 2^{\mu_{PUCCH}-\mu_{PDCCH}} \rfloor + K + K_{offset}$, wherein:
the PDCCH is received in the first slot n,
$\mu_{PUSCH}$ is a subcarrier spacing of the PUSCH,
$\mu_{PDCCH}$ is a subcarrier spacing of the PDCCH,
K is an offset value indicated in the DCI, and
$K_{offset}$ is the additional offset.

5. The UE of claim 1, wherein:
the UL transmission includes Channel State Information (CSI); and
a CSI reference resource is provided in the DL channel in the first slot $n - n_{CSI\_ref}$ where the $$n = \left\lfloor (n' - K_{offset}) \cdot \frac{2^{\mu_{DL}}}{2^{\mu_{UL}}} \right\rfloor,$$

wherein:
$n_{CSI\_ref}$ is an offset value determined by the UE,
the CSI transmission is in the second slot n',
$\mu_{DL}$ is a subcarrier spacing of the DL channel,
$\mu_{UL}$ is a subcarrier spacing of the UL channel, and
$K_{offset}$ is the additional offset.

6. The UE of claim 1, wherein:
the DL channel is a Physical Downlink Control Channel (PDCCH); and
the UL transmission includes the at least one triggered aperiodic SRS transmission in the at least one triggered aperiodic SRS resource set in the second slot $$\left\lfloor n \cdot 2^{\frac{\mu_{SRS}}{\mu_{PDCCH}}} \right\rfloor + k + K_{offset},$$

wherein:
the DCI received in the first slot n triggers the at least one aperiodic SRS transmission,
$\mu_{SRS}$ is the subcarrier spacing of the at least one triggered aperiodic SRS transmission,
$\mu_{PDCCH}$ is the subcarrier spacing of the PDCCH,
K is the configured offset value indicated in the DCI, and
$K_{offset}$ is the additional offset.

7. The UE of claim 1, wherein:
the DL channel is a Physical Downlink Shared Channel (PDSCH) having a Random Access Response (RAR) message ending in the first slot n;
the RAR message is in response to a Physical Random Access Channel (PRACH) preamble transmitted by the UE;
the UL channel is a Physical Uplink Shared Channel (PUSCH);
the UL transmission includes at one transport block (TB); and
the TB on the PUSCH is transmitted in the second slot $n' + K_2 + \Delta + K_{offset}$, where $n' = \lfloor n \cdot 2^{\mu_{PUCCH}-\mu_{PDCCH}} \rfloor$, wherein:
$\mu_{PUSCH}$ is a subcarrier spacing of the PUSCH,
$\mu_{PDSCH}$ is a subcarrier spacing of the PDSCH,
$K_2$ is an offset value based on a numerology of the PUSCH,
$\Delta$ is an additional subcarrier spacing specific slot delay value for a first transmission of the PUSCH scheduled by the RAR message, and
$K_{offset}$ is the additional offset.

8. A method performed by a user equipment (UE), the method comprising:
- receiving downlink control information (DCI) on a downlink (DL) channel in a non-terrestrial network (NTN), the DL channel being received in a first slot; and
- performing an uplink (UL) transmission on a UL channel of the NTN in a second slot separated from the first slot by a timing offset, wherein:
- in a case where the DCI is to trigger at least one aperiodic Sounding Reference Signal (SRS) transmission:
  - the UL transmission includes the at least one triggered aperiodic SRS transmission in at least one triggered aperiodic SRS resource set, and
  - a duration of the timing offset is determined based on a combination of (i) a subcarrier spacing of the at least one triggered aperiodic SRS transmission, Lila subcarrier spacing of the DL channel, (iii) a configured offset value that is configured through RRC signaling to indicate a slot for the at least one triggered aperiodic SRS transmission, and (iv) an additional offset that is added to a required timing advance (TA) to compensate for a processing delay due to operation in the NTN.

9. The method of claim 8, wherein:
the DL channel is a Physical Downlink Control Channel (PDSCH);
the UL channel is a Physical Uplink Control Channel (PUCCH);
the UL transmission includes a Hybrid Automatic Repeat Request (HARQ)-Acknowledgement (ACK); and
the HARQ-ACK on the PUCCH is transmitted on the second slot $\lfloor n \cdot 2^{\mu_{PUCCH}-\mu_{PDCCH}} \rfloor + K_1 + K_{offset}$, wherein:
the PDCCH is received in the first slot n,
$\mu_{PUCCH}$ is a subcarrier spacing of the PUCCH,
$\mu_{PDCCH}$ is a subcarrier spacing of the PDCCH,
$K_1$ is an offset value indicated in the DCI, and
$K_{offset}$ is the additional offset.

10. The method of claim 8, wherein:
the DL channel is a Physical Downlink Control Channel (PDCCH);
the UL channel is a Physical Uplink Shared Channel (PUSCH); and
the UL transmission on the PUSCH is scheduled by the DCI, and is transmitted on the second slot $\lfloor n \cdot 2^{\mu_{PUCCH}-\mu_{PDCCH}} \rfloor + K_2 + K_{offset}$, wherein:
the PDCCH is received in the first slot n,
$\mu_{PUSCH}$ is a subcarrier spacing of the PUSCH,
$\mu_{PDCCH}$ is a subcarrier spacing of the PDCCH,
$K_2$ is an offset value based on a numerology of the PUSCH, and
$K_{offset}$ is the additional offset.

11. The method of claim 8, wherein: $K_{offset}$, wherein:
the DL channel is a Physical Downlink Control Channel (PDCCH);
the UL channel is a Physical Uplink Shared Channel (PUSCH);
the UL transmission includes Channel State Information (CSI); and
the CSI on the PUSCH is transmitted on slot $\lfloor n \cdot 2^{\mu_{PUCCH}-\mu_{PDCCH}} \rfloor + K + K_{offset}$, wherein
the PDCCH is received in the first slot n,
$\mu_{PUSCH}$ is a subcarrier spacing of the PUSCH,
$\mu_{PDCCH}$ is a subcarrier spacing of the PDCCH,
K is an offset value indicated in the DCI, and
$K_{offset}$ is the additional offset.

12. The method of claim 8, wherein:
the UL transmission includes Channel State Information (CSI); and
a CSI reference resource is provided in the DL channel in the first slot $n - n_{CSI\_ref}$, where $$n = \left\lfloor (n' - K_{offset}) \cdot \frac{2^{\mu_{DL}}}{2^{\mu_{UL}}} \right\rfloor,$$

wherein:
$n_{CSI\_ref}$ is an offset value determined by the UE,
the CSI transmission is in the second slot if,
$\mu_{DL}$ is a subcarrier spacing of the DL channel,
$\mu_{UL}$ is a subcarrier spacing of the UL channel, and
$K_{offset}$ is the additional offset.

13. The method of claim 8, wherein:
the DL channel is a Physical Downlink Control Channel (PDCCH); and
the UL transmission includes the at least one triggered aperiodic SRS transmission in the at least one triggered aperiodic SRS resource set in the second slot $$\lfloor n \cdot 2^{\frac{\mu_{SRS}}{\mu_{PDCCH}}} \rfloor + k + K_{offset},$$

wherein:
the DCI received in the first slot n triggers the at least one aperiodic SRS transmission,
$\mu_{SRS}$ is the subcarrier spacing of the at least one triggered aperiodic SRS transmission,
$\mu_{PDCCH}$ is the subcarrier spacing of the PDCCH,
K is the configured offset value indicated in the DCI, and
$K_{offset}$ is the additional offset.

14. The method of claim 8, wherein:
the DL channel is a Physical Downlink Shared Channel (PDSCH) having a Random Access Response (RAR) message ending in the first slot n;
the RAR message is in response to a Physical Random Access Channel (PRACH) preamble transmitted by the UE;
the UL channel is a Physical Uplink Shared Channel (PUSCH);
the UL transmission includes at one transport block (TB); and
the TB on the PUSCH is transmitted in the second slot $n' + K_2 + \Delta + K_{offset}$, where $n' = \lfloor n \cdot 2^{\mu_{PUCCH}-\mu_{PDCCH}} \rfloor$, wherein:
$\mu_{PUSCH}$ is a subcarrier spacing of the PUSCH,
$\mu_{PDSCH}$ is a subcarrier spacing of the PDSCH,
$K_2$ is an offset value based on a numerology of the PUSCH,
$\Delta$ is an additional subcarrier spacing specific slot delay value for a first transmission of the PUSCH scheduled by the RAR message, and
$K_{offset}$ is the additional offset.

* * * * *